United States Patent
Rabii et al.

(10) Patent No.: US 9,591,582 B1
(45) Date of Patent: Mar. 7, 2017

(54) SMART CO-PROCESSOR FOR OPTIMIZING SERVICE DISCOVERY POWER CONSUMPTION IN WIRELESS SERVICE PLATFORMS

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Marcello Vincenzo Lioy, Mercer Island, WA (US); Fawad Shaukat, San Diego, CA (US); Craig Dowell, Bellevue, WA (US); Shivakumar Balasubramanyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/850,793

(22) Filed: Sep. 10, 2015

(51) Int. Cl.
*H04W 52/02* (2009.01)
*H04W 76/02* (2009.01)
(Continued)

(52) U.S. Cl.
CPC ......... *H04W 52/028* (2013.01); *H04L 43/028* (2013.01); *H04L 67/16* (2013.01); *H04W 76/023* (2013.01)

(58) Field of Classification Search
CPC .. H04N 21/4126; H04W 48/16; H04W 48/10; H04W 8/005; H04W 52/0209; H04W 52/0229; H04W 72/0446; H04L 5/0092
(Continued)

(56) References Cited

U.S. PATENT DOCUMENTS 7,038,687 B2   5/2006   Booth, Jr. et al.
8,065,536 B2   11/2011  Ely
(Continued)

FOREIGN PATENT DOCUMENTS

CN    104754691    7/2015

OTHER PUBLICATIONS

Aruba Networks, "DLNA, AirPlay and AirPrint on Campus Networks", Solution Guide, 2014, 8 Pages.
(Continued)

*Primary Examiner* — Phuoc H Doan
(74) *Attorney, Agent, or Firm* — Muncy, Geissler, Olds & Lowe, P.C.

(57) ABSTRACT

The disclosure relates to a low-power co-processor subsystem that can optimize power consumption in a wireless service platform having a main wireless application datapath, wherein the low-power co-processor subsystem may offload certain service discovery tasks from the main wireless application datapath (e.g., such that components residing therein can transition to a low-power state). For example, the service discovery tasks offloaded to the low-power co-processor subsystem may be determined according to protocol-specific service descriptions associated with one or more services to be provided and/or consumed at a wireless device. Furthermore, rules to wake the components in the main wireless application datapath may be dynamically defined and redefined or otherwise tuned to maximize the time that the components in the main wireless application datapath can spend in the low-power state and to determine conditions under which to selectively wake the components in the main wireless application datapath as needed.

30 Claims, 12 Drawing Sheets

(51) Int. Cl.
 H04L 12/26 (2006.01)
 H04L 29/08 (2006.01)
(58) Field of Classification Search
 USPC .............. 455/515, 524, 41.2, 517, 500, 518;
 370/312, 254; 348/552
 See application file for complete search history.

(56) References Cited

U.S. PATENT DOCUMENTS

| | | | |
|---|---|---|---|
| 8,463,333 | B2 | 6/2013 | Stuivenwold |
| 8,498,229 | B2 | 7/2013 | Sood |
| 9,107,164 | B1 | 8/2015 | Troyanker et al. |
| 2007/0004436 | A1 | 1/2007 | Stirbu |
| 2014/0143569 | A1 | 5/2014 | Banerjee |
| 2014/0206407 | A1* | 7/2014 | Kim .................. H04W 8/005 455/515 |
| 2016/0094957 | A1* | 3/2016 | Levy .................. H04W 4/08 455/518 |

OTHER PUBLICATIONS

Bettstetter C., et al., "A Comparison of Service Discovery Protocols a Implementation of the Service Location Protocol", Proceedings of EUNICE, 2000, 8 Pages.

Chiu C-F., et al., "An Intelligent Home Environment based on Service Planning over Peer-to-Peer Overlay Network", Journal of Software, Nov. 2008, vol. 3, No. 8, pp. 3-10.

Doulkeridis C., et al., "A System Architecture for Context-Aware Service Discovery", Electronic Notes in Theoretical Computer Science 146, 2006, pp. 101-116.

Hsu T-H., et al., "A Dynamic P2P Resource Sharing Architecture for Adapting MPEG-21 Digital Items in Mobile Networks", International Journal of Hybrid Information Technology, Oct. 2008, vol. 1, No. 4, pp. 39-48.

Kaffille S., et al., "Distributed Service Discovery with Guarantees in Peer-to-Peer Networks using Distributed Hashtables", PDPTA 2005, Jun. 2005, vol. 2, 7 Pages.

Kistler R., et al., "An Adaptive Network Architecture for Home- and Building Environments", IEEE International Conference on Emerging Technologies and Factory Automation, Sep. 2008, pp. 295-302.

Lee C., et al., "Protocols for Service Discovery in Dynamic and Mobile Networks," International Journal of Computer Research, 2002, vol. 11 (1), pp. 1-12.

Marin-Perianu R., et al., "A Classification of Service Discovery Protocols", Jun. 2005, 22 Pages.

Meersman D., et al., "Health Service Discovery and Composition in Ambient Assisted Living: the Australian Type 2 Diabetes Case Study", 46th Hawaii International Conference on System Sciences, IEEE, 2013, pp. 1337-1346.

Ranjani H.R., et al., "WFDS—A new Emerging technology over Wi-Fi Direct", International Journal of Emerging Research in Management &Technology, Apr. 2014, vol. 3, Issue 4, pp. 120-124, ISSN: 2278-9359.

Su X., et al., "Service Organization and Discovery for Facilitating RFID Network Manageability and Usability via WinRFID Middleware", Wireless Telecommunications Symposium, WTS 2008, Apr. 2008, pp. 392-398.

Vasseur C, "Unofficial AirPlay Protocol Specification", Mar. 2012, pp. 1-34, Retrieved from URL: http://nto.github.io/AirPlay.html on Sep. 3, 2015.

Wi-Fi Alliance, "Wi-Fi Peer-to-Peer Services (P2Ps) Technical Specification (for Wi-Fi Direct® services certification) Version 1.2", 2014, pp. 1-100.

Zurita G., et al., "An Ad-Hoc Wireless Network Architecture for Face-to-Face Mobile Collaborative Applications", OAI, Jan. 2006, pp. 42-55.

International Search Report and Written Opinion—PCT/US2016/046959—ISA/EPO—Oct. 17, 2016 (153199W0).

TransferJet Consortium, "TransferJet Overview/Concept and Technology", Rev. 1.5, Aug. 2015, 45 Pages.

\* cited by examiner

SMART CO-PROCESSOR FOR OPTIMIZING SERVICE DISCOVERY POWER CONSUMPTION IN WIRELESS SERVICE PLATFORMS

TECHNICAL FIELD

Various aspects and embodiments described herein generally relate to a smart co-processor that may be provided in a wireless application processing datapath to optimize service discovery power consumption in wireless service platforms that employ out-of-band device-to-device (D2D) communication between peer wireless devices.

BACKGROUND

Wireless communication systems are widely deployed to provide various types of communication content, including voice, video, packet data, messaging, and broadcast, among many others. Wireless communication systems (e.g., multiple-access networks that can share available network resources to support multiple users) have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different wireless communication systems in use, including Cellular and Personal Communications Service (PCS) systems. Example cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), Orthogonal FDMA (OFDMA), Single-Carrier FDMA (SC-FDMA), the Global System for Mobile access (GSM) TDMA variation, and newer hybrid digital communication systems that use both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

In general, a wireless communication network may include various base stations (also referred to as evolved node Bs, eNBs, or access nodes) that can support communication for a user equipment (UE). In a WAN, a UE typically communicates via uplink/downlink channels between the UE and a base station to thereby communicate with the base station. However, if two or more UEs are in within sufficient proximity to one another, the UEs may be enabled to communicate directly, that is, without communicating through any base station. A UE may therefore support direct peer-to-peer (P2P) or device-to-device (D2D) communication with one or more other UEs.

For example, LTE-Direct (LTE-D, sometimes also referred to as "LTE-Advanced") is a proposed 3GPP (Release 12) D2D solution for proximate discovery. LTE-D dispenses with location tracking and network calls by directly monitoring for services on other LTE-Direct devices within a large range (~500 m, line of sight). As such, among other advantages, LTE-D can directly monitor for services on other LTE-D devices in a synchronous system and concurrently detect many services in proximity in a continuous and battery efficient manner. In another example, the Wi-Fi Alliance Peer-to-Peer (P2P) Specification, also known as "Wi-Fi Direct" (WFD), supports pre-association service discovery among peer wireless devices. The WFD protocol enables a client wireless device or station (STA) to query peer STAs within Wi-Fi range to determine what services, if any, are available on the peer STAs. Determining the services that peer STAs provide typically involves a device discovery phase and a service discovery phase. During the device discovery phase, a client STA (e.g., a STA requesting a particular P2P service) determines the identity and/or availability associated with other STAs within Wi-Fi communication range via "scanning" the three social channels (e.g., channels 1, 6, and 11 in the 2.4 GHz band) to detect incoming beacon frames and/or broadcasting probe request frames to any client STAs that may be listening on the social channels. Thereafter, during the service discovery phase, the client STA queries any available peer STAs that may have been discovered during the device discovery phase about the services that the available peer STAs provide. For example, the client STA typically transmits one or more service discovery requests to each peer STA that supports the service discovery operation, one at a time, until the client STA identifies a suitable peer STA that provides the requested service.

Accordingly, service discovery messaging and signaling is the bedrock for many wireless use cases and application platforms, which may include mirroring, screen sharing, streaming video, streaming audio, remote video/graphics rendition, remote audio rendition, remote sensing, remote control, and file transfers, among many others. In general, service discovery messages and signaling can be used to support announcements and inquiries, composition and mediation, control and presentation, and can further be extended to group management and addressing control, quality of service (QoS) and/or quality of experience (QoE) management, and various other wireless use cases. In any particular wireless application and/or use case where service discovery messaging is used to support out-of-band P2P and/or D2D communication, a wireless application processing datapath can include many ad-hoc devices that will often have unequal capabilities, processing densities, storage capacities, connection and power performance profiles, etc. Furthermore, any device can operate autonomously and without awareness of other devices, whereby operational dependencies and required collaboration among different devices are typically validated and resolved per-application and/or use case. Hence, a collaborative and distributed (unstructured) service discovery framework typically requires regular service discovery messaging, which may require that each peer device maintain one or more components in a wireless application datapath in an always-on state (e.g., a host bridge, interconnect and system memory, host application processor and high-level operating system typically used to process service discovery messages and signaling).

As such, the need to process and respond to occasional service discovery messages may cause components in the wireless application datapath to stay in an always-on state, which can consume substantial power even though service discovery messages typically have small payloads (e.g., a few bytes). Furthermore, because each client STA typically has no knowledge about whether or not the service(s) that other previously discovered peer STAs provide have changed unless the service discovery (and device discovery) operations are periodically repeated with each peer STA, establishing and maintaining out-of-band P2P and/or D2D connections can consume substantial time and resources, which may be especially problematic in battery-powered electronic devices.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects disclosed herein in a simplified form to precede the detailed description presented below.

According to various aspects, a low-power co-processor may be used to optimize power consumption in a wireless service platform with a main wireless application datapath, wherein certain service discovery tasks may be offloaded from the main wireless application datapath to the low-power co-processor subsystem (e.g., such that components in the main wireless application datapath can transition to and/or remain in a low-power state as much as possible). For example, the service discovery tasks offloaded to the low-power co-processor subsystem may be determined according to protocol-specific service descriptions associated with one or more services to be provided and/or consumed at the wireless device. Furthermore, rules to wake the components in the main wireless application datapath may be dynamically defined and redefined or otherwise tuned to maximize the time that the components in the main wireless application datapath can spend in a low-power state and to determine conditions under which to selectively wake the components in the main wireless application datapath as needed.

According to various aspects, a method for optimizing power consumption in a service discovery wireless services platform may comprise establishing a peer-to-peer wireless connection at a wireless device, transitioning one or more components in a main wireless application datapath associated with the wireless device (e.g., a main application processor) to a sleep state, and offloading one or more service discovery tasks from the one or more components transitioned to the sleep state to a low-power co-processor coupled to the one or more components in the main wireless application datapath, wherein the one or more service discovery tasks offloaded to the low-power co-processor may be determined at least in part according to a service description associated with a service discovery protocol used in the peer-to-peer wireless connection. Furthermore, according to various embodiments, the method may comprise defining one or more dynamic rules to wake the one or more components in the main wireless application datapath from the sleep state based at least in part on the service description associated with the service discovery protocol used in the peer-to-peer wireless connection. As such, in response to receiving one or more incoming data packets over the peer-to-peer wireless connection at the low-power co-processor, the one or more components in the main wireless application datapath may be selectively woken from the sleep state in response to the one or more incoming data packets having criteria that trigger the one or more dynamic rules.

According to various aspects, an apparatus may comprise means for establishing a peer-to-peer wireless connection, means for transitioning one or more components in a main wireless application datapath to a sleep state, means for offloading one or more service discovery tasks from the one or more components transitioned to the sleep state, wherein the one or more offloaded service discovery tasks may be determined at least in part according to a service description associated with a service discovery protocol used in the peer-to-peer wireless connection, means for defining one or more dynamic rules to wake the one or more components in the main wireless application datapath from the sleep state based at least in part on the service description associated with the service discovery protocol used in the peer-to-peer wireless connection, means for receiving one or more incoming data packets over the peer-to-peer wireless connection, and means for selectively waking the one or more components in the main wireless application datapath from the sleep state in response to the one or more incoming data packets having criteria that trigger the one or more dynamic rules.

According to various aspects, a computer-readable storage medium may have computer-executable instructions recorded thereon, wherein executing the computer-executable instructions on one or more processors may cause the one or more processors to establish a peer-to-peer wireless connection at a wireless device, transition one or more components in a main wireless application datapath associated with the wireless device to a sleep state, offload one or more service discovery tasks from the one or more components transitioned to the sleep state to a low-power co-processor coupled to the one or more components in the main wireless application datapath, define one or more dynamic rules to wake the one or more components in the main wireless application datapath from the sleep state based at least in part on a service description associated with the service discovery protocol used in the peer-to-peer wireless connection, receive, at the low-power co-processor, one or more incoming data packets over the peer-to-peer wireless connection, and selectively wake the one or more components in the main wireless application datapath from the sleep state in response to the one or more incoming data packets having criteria that trigger the one or more dynamic rules.

According to various aspects, a wireless device may comprise a main wireless application datapath that includes a host bridge, an interconnect, system memory, and a host application processor in addition to a low-power hardware processor coupled to the main wireless application datapath. For example, according to various embodiments, the low-power hardware processor may comprise a local memory configured to store one or more outgoing data packets associated with one or more service discovery tasks offloaded from the main wireless application datapath and a schedule to send the one or more outgoing data packets, a programmable deep-packet inspection module configured with one or more dynamic rules to invoke processing in main wireless application datapath and to determine whether criteria associated with one or more incoming data packets received at the wireless device trigger the one or more dynamic rules, wherein the one or more dynamic rules may be based at least in part on a service description associated with a service discovery protocol. In addition, according to various embodiments, the low-power hardware processor may comprise a low-power host processor configured to perform the one or more offloaded service discovery tasks, to respond to the one or more incoming data packets without invoking processing in the main wireless application datapath in response to the criteria associated with the one or more incoming data packets not triggering the one or more dynamic rules, and to invoke the processing in the main wireless application datapath in response to the criteria associated with the one or more incoming data packets triggering the one or more dynamic rules.

Other objects and advantages associated with the various aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
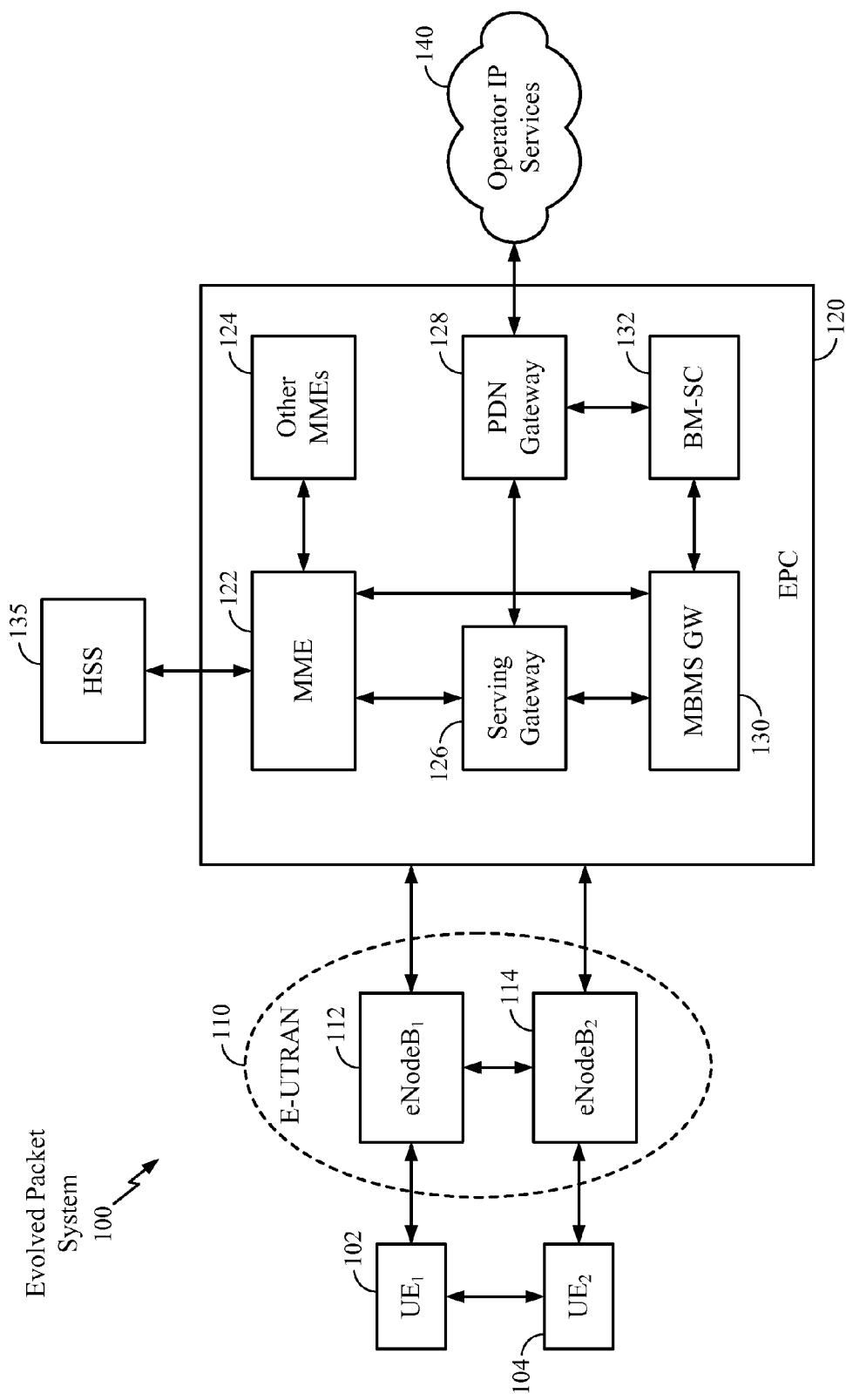
FIG. 1 illustrates an exemplary wireless network architecture that may support out-of-band device-to-device (D2D) communication, according to various aspects.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further appreciate that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by computer-executable instructions being executed by one or more processors, or a combination thereof. Additionally, these sequence of actions described herein can be considered to be embodied entirely within any form of computer readable storage medium having stored therein a corresponding set of computer-executable instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used in connection with various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP).

CDMA2000 and UMB are described in documents from an organization named "3rd Generation Partnership Project 2" (3GPP2). For clarity, certain aspects are described below for LTE, and LTE terminology may be used in much of the description below.

According to various aspects, FIG. 1 illustrates an exemplary wireless network architecture 100 that may support out-of-band device-to-device (D2D) communication, wherein the wireless network architecture 100 may comprise a Long Term Evolution (LTE) (or Evolved Packet System (EPS)) network architecture 100. In various embodiments, the network architecture 100 may include a first user equipment ($UE_1$) 102, a second user equipment ($UE_2$) 104, an Evolved UMTS Terrestrial Radio Access Network (E-UTRAN) 110, an Evolved Packet Core (EPC) 120, a Home Subscriber Server (HSS) 135, and Internet Protocol (IP) Services 140 associated with an operator (e.g., a mobile network operator (MNO)). The EPS network architecture 100 can interconnect with other access networks and core networks (not shown), such as a UMTS access network or an IP core network. As shown, the EPS network architecture 100 provides packet-switched services; however, those skilled in the art will readily appreciate that the various concepts disclosed herein may be extended to networks that provide circuit-switched services.

According to various embodiments, the E-UTRAN 110 may include a first evolved Node B ($eNB_1$) 112 in communication with $UE_1$ 102 and a second eNB ($eNB_2$) 114 in communication with $UE_2$ 104. The eNBs 112, 114 may provide user and control plane protocol terminations toward the UEs 102, 104 and may be connected to each other via a backhaul (e.g., an X2 interface). The eNBs 112, 114 may also be referred to as base stations, Node Bs, access points, base transceiver stations, radio base stations, radio transceivers, transceiver functions, a basic service set (BSS), an extended service set (ESS), or some other suitable terminology. The eNBs 112, 114 each provide an access point to the EPC 120 for the respective UEs 102, 104. Example UEs 102, 104 may include, without limitation, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. Furthermore, those skilled in the art will appreciate that $UE_1$ 102 and/or $UE_2$ 104 may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, etc.

The eNBs 112, 114 may each connect to the EPC 120 via an Si interface, wherein the EPC 120 may include a Mobility Management Entity (MME) 122, other MMEs 124, a Serving Gateway 126, a Multimedia Broadcast Multicast Service (MBMS) Gateway 130, a Broadcast Multicast Service Center (BM-SC) 132, and a Packet Data Network (PDN) Gateway 128. The MME 122 is a control node that may process signaling between the UEs 102, 104 and the EPC 120. Generally, the MME 122 provides bearer and connection management, while all user IP packets are transferred through the Serving Gateway 126, which may be connected to the PDN Gateway 128. The PDN Gateway 128 may provide UE IP address allocation as well as other functions. The PDN Gateway 128 is connected to the Operator IP Services 140, which may include the Internet, an intranet, an IP Multimedia Subsystem (IMS), a PS Streaming Service (PSS), and/or other suitable services. The BM-SC 132 may provide functions for MBMS user service provisioning and delivery and serve as an entry point for content provider MBMS transmission. Furthermore, according to various aspects, the BM-SC 132 may authorize and initiate MBMS Bearer Services within a PLMN, schedule and deliver MBMS transmissions, and/or provide other similar functions. The MBMS Gateway 130 may be used to distribute MBMS traffic to one or more eNBs that belong to a Multicast Broadcast Single Frequency Network (MBSFN) area broadcasting a particular service (e.g., eNBs 112, 114), and may be responsible for session management (start/stop) and collecting eMBMS related charging information.

In various embodiments, a UE pair (e.g., $UE_1$ 102 and $UE_2$ 104) may establish an out-of-band device-to-device (D2D) connection to communicate directly without utilizing the respective $eNB_1$ 112 and $eNB_2$ 114 and subsequently transfer data traffic over the out-of-band D2D connection. In general, one or more entities in the network infrastructure (e.g., eNBs 112, 114, entities in the EPC 120, etc.) may coordinate the out-of-band D2D communication between the UE pair 102, 104, meaning that the network entities may assist in establishing the out-of-band D2D connection, control use in a D2D mode versus a legacy mode, provide security support, etc. As used herein, the terms "out-of-band D2D connection," "D2D mode," and/or other variants thereof may generally refer to direct communication between two or more UEs 102, 104 that does not pass through any base station, and the term "legacy connection," "legacy mode," and/or other variants thereof may generally refer to communication via the network (e.g., via the eNBs 112, 114). In various embodiments, the UE pair 102, 104 may establish the out-of-band D2D connection autonomously, wherein initial discovery used to establish the out-of-band D2D connection may be based on an ability to communicate signals directly between the UEs 102, 104. Additionally (or in the alternative), UEs that are attached to a network that does not support the D2D mode but permits the D2D mode, the UEs 102, 104 may connect via the network and exchange serving cell and location information to determine whether the D2D mode is possible. Once the D2D mode is in progress, the UEs 102, 104 may monitor relative locations associated therewith. Furthermore, a group including three or more UEs may enter the D2D mode whereby some or all UE pairs in the group may maintain direct D2D communication between one another and whereby some UEs in the group may act as relays to relay D2D communication between other UEs in the group. For example, one UE in the group may be designated to operate in a relay role to maintain direct D2D communication with the other UE(s) in the group and act in a relay role in order to enable the other UE(s) to communicate indirectly via D2D communication. In this example, the UE operating in the relay role may act to relay communications between the other UE(s) in the group. A group that includes several UEs employing D2D communication between one another may monitor relative locations associated therewith and assign (and/or reassign) the relay role to any UE in the group based on the current relative locations associated therewith.

Returning to FIG. 1, in another aspect, the network may assist the two or more UEs 102, 104 to enter the D2D mode in cases where the legacy mode may be unavailable and/or impossible (e.g., if the network is congested or portions thereof have temporarily failed or do not provide continuous radio coverage to both UEs 102, 104). In another aspect, the network (e.g., one or more network entities) may control entry to the D2D mode and support handover between the D2D mode and legacy mode.

Figure 2:
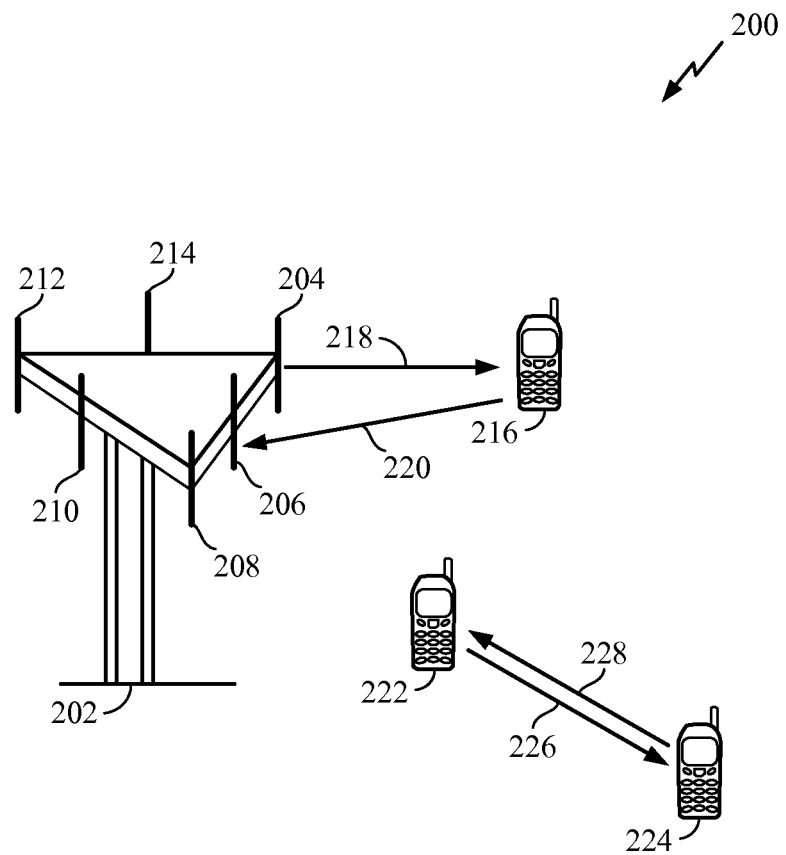
FIG. 2 illustrates another exemplary wireless network architecture supporting out-of-band device-to-device (D2D) communication, according to various aspects.

According to various aspects, FIG. 2 illustrates another exemplary wireless network architecture 200 supporting out-of-band D2D communication (e.g., using LTE-Direct (LTE-D), Wi-Fi Direct (WFD), or another suitable D2D radio access technology). In particular, the wireless network architecture 200 shown in FIG. 2 may comprise a base station 202 that may include multiple antenna groups (e.g., one antenna group may include antennas 204 and 206, another group may comprise antennas 208 and 210, an additional group may include antennas 212 and 214, etc.). Although the example shown in FIG. 2 illustrates the base station 202 with two antennas for each antenna group, those skilled in the art will appreciate that more or fewer antennas may be utilized for each group. In various embodiments, the base station 202 may additionally include a transmitter chain and a receiver chain (not shown), which may each in turn comprise a various components associated with signal transmission and reception (e.g., processors, modulators, multiplexers, demodulators, demultiplexers, antennas, and so forth), as will be apparent to those skilled in the art. Additionally, the base station 202 may be a home base station, a femto base station, a wireless local area network (WLAN) access point, and/or the like.

According to various aspects, the base station 202 may communicate with one or more devices, such as device 216. However, those skilled in the art will appreciate that in various embodiments, the base station 202 may communicate with substantially any number of devices similar to the device 216. As depicted in FIG. 2, the device 216 is in communication with the base station 202 via antennas 204 and 206, where antennas 204 and 206 may generally transmit information to the device 216 over a forward link 218 and receive information from the device 216 over a reverse link 220. In a frequency division duplex (FDD) system, the forward link 218 may utilize a different frequency band than that the reverse link 220, for example. Further, in a time division duplex (TDD) system, the forward link 218 and the reverse link 220 may utilize a common frequency band.

In addition, according to various aspects, FIG. 2 illustrates a first peer device 222 and a second peer device 224 that are in direct communication with one another, such as in a D2D (or peer-to-peer (P2P)) configuration using LTE-Direct, Wi-Fi Direct, etc. Moreover, the first peer device 222 is in communication with the second peer device 224 using links 226 and 228. For example, in a D2D or P2P ad hoc network, devices within range of each other, such as devices 222 and 224, may communicate with each other directly without any intermediate base station 202 and/or a wired infrastructure to relay communication therebetween. Additionally, the peer devices (or nodes) 222, 224 may relay traffic, whereby the peer devices 222, 224 within the wireless network architecture 200 that communicate over an out-of-band D2D connection may provide functionality otherwise similar to the base station 202 and relay traffic or communications to other devices, until the traffic reaches the ultimate destination associated therewith. The peer devices 222, 224 may also transmit control channels, which may carry information that can be utilized to manage the data transmission between the peer nodes.

According to various aspects, the wireless network architecture 200 may include various devices (or nodes) that are in wireless (or wired) communication, wherein each node may be within sufficient range to one or more other nodes to communicate with the other nodes or utilize the other nodes, such as in a multi-hop topology (e.g., communications may hop from node to node until reaching a final destination). For example, the second peer device 224 may comprise a sender node that wishes to communicate with device 216 as a receiver node. To enable packet transfer between the sender node 224 and the receiver node 216, one or more intermediate nodes may be utilized (e.g., the first peer device 222 may act as an intermediate node to relay communications from the sender node 224 to the base station 202, which may also act as an intermediate node to relay the communications to the receiver node 216). However, those skilled in the art will appreciate that any node may be a sender node and/or a receiver node and may perform functions to either send and/or receive information at substantially the same time (e.g., a particular node may broadcast or communicate information at about the same time as receiving information, at different times, etc.). Furthermore, according to various aspects, the wireless network architecture 200 may be configured to allow nodes that have initiated a communication session over a network (e.g., via the base station 202) to move the session to a direct D2D connection in which directly connected nodes may exchange packets natively without any encapsulation. In accordance with various aspects, a "homeless" node may switch to a wireless network without losing an ongoing session, wherein a "homeless" may refer to a node that does not have any home agent entity to assist with keeping ongoing sessions alive while switching to foreign networks and/or to forward any new incoming request(s) to establish new sessions to the node's current location. According to various aspects, nodes may be mobile (e.g., wireless), static (e.g., wired), or any suitable combination thereof.

Figure 3:
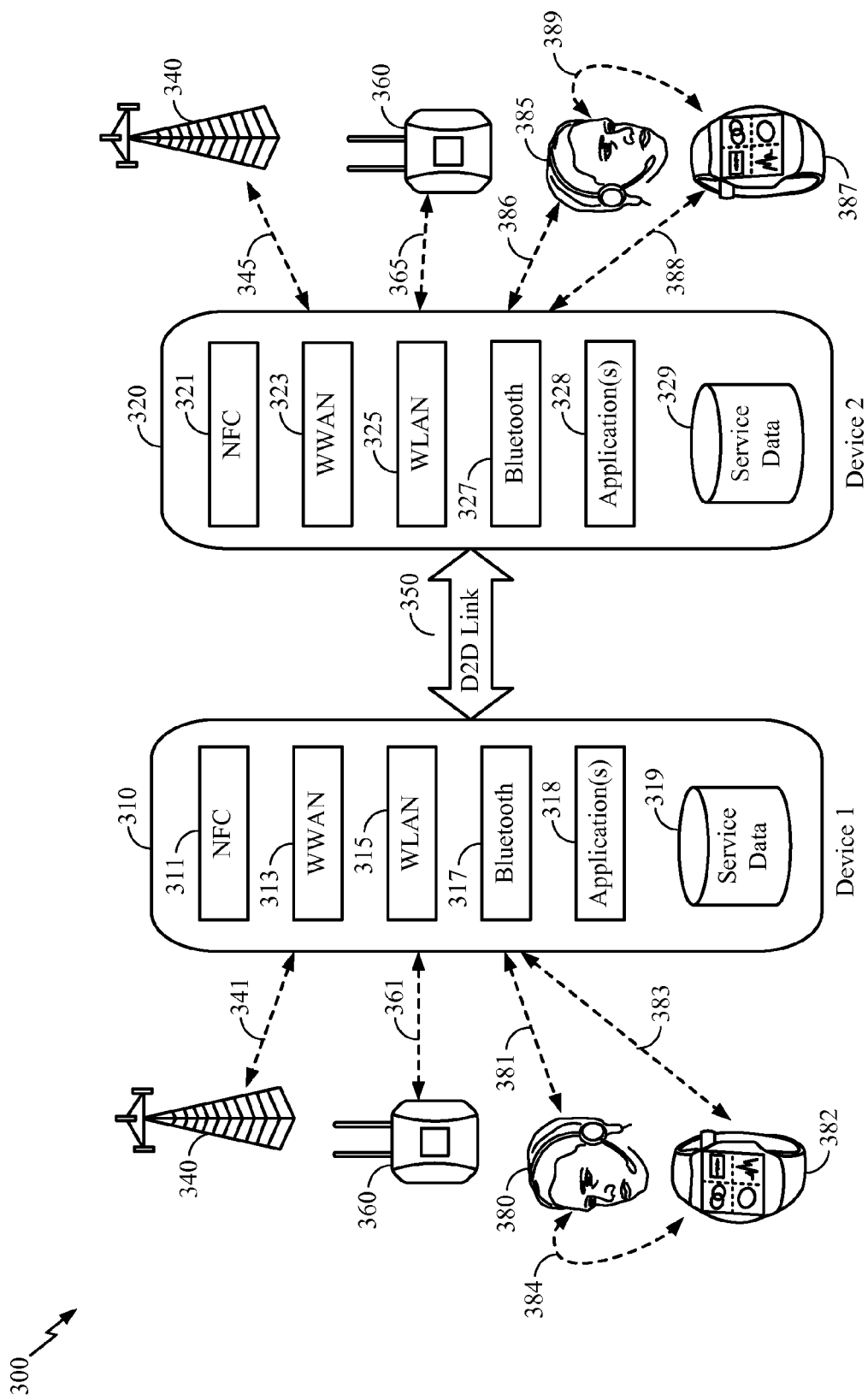
FIG. 3 illustrates an exemplary wireless environment in which two wireless devices may communicate over an out-of-band D2D connection, according to various aspects.

According to various aspects, FIG. 3 illustrates an exemplary wireless environment 300 in which two wireless devices 310, 320 may establish and communicate over an out-of-band D2D connection 350 in the event that the two wireless devices 310, 320 are located in sufficient proximity to establish the out-of-band D2D connection 350. More particularly, as shown in FIG. 3, the wireless device 310 may have a near-field communication (NFC) radio 311, a wireless wide area network (WWAN) radio 313, a wireless local area network (WLAN) radio 315, and a Bluetooth radio 317 that the wireless device 310 can use to communicate within the wireless environment 300. For example, as depicted in FIG. 3, the wireless device 310 can wirelessly communicate with a cellular base station 340 over a WWAN link 341 using the WWAN radio 313. The wireless device 310 can also wirelessly communicate with a Wi-Fi access point 360 over a WLAN link 361 using the WLAN radio 315. Furthermore, the wireless device 310 can wirelessly communicate with a Bluetooth headset 380 and Bluetooth-enabled wearable device 382 over Bluetooth links 381, 383 using the Bluetooth radio 317, wherein the Bluetooth headset 380 and the Bluetooth-enabled wearable device 382 may be in further wireless communication with each other over a Bluetooth link 384. Further still, the wireless device 310 can wirelessly communicate with one or more NFC devices within the "near field" of the wireless device 310 using the NFC radio 311 via magnetic field induction.

Furthermore, according to various aspects, the second wireless device 320 may likewise have multiple radios that each operate in accordance with a different radio access technology. For example, as shown in FIG. 3, the second wireless device 320 may also have an NFC radio 321, a WWAN radio 323, a WLAN radio 325, and a Bluetooth radio 327, wherein the wireless device 320 can use the radios 321, 323, 325, 327 to communicate within the wireless environment 300. For example, as depicted in FIG. 3, the wireless device 320 can wirelessly communicate with a cellular base station 340 over a WWAN link 345 using the WWAN radio 323, with a Wi-Fi access point 360 over a WLAN link 365 using the WLAN radio 325, with a Bluetooth headset 385 and a Bluetooth-enabled wearable device 387 over Bluetooth links 386, 388 using the Bluetooth radio 327, wherein the Bluetooth headset 385 and the Bluetooth-enabled wearable device 387 may be in further wireless communication with each other over a Bluetooth link 389. Further still, the wireless device 320 can wirelessly communicate with one or more NFC devices within the "near field" of the wireless device 320 using the NFC radio 321 via magnetic field induction. Furthermore, those skilled in the art will appreciate that although the wireless devices 310, 320 are depicted in FIG. 3 as communicating with the same cellular base station 340, in which case the WWAN links 341, 345 may have a common endpoint, the wireless devices 310, 320 may in fact be in communication with different cellular base stations via respective WWAN links 341, 345. Analogously, although the wireless devices 310, 320 are depicted in FIG. 3 as communicating with the same Wi-Fi access point 360, those skilled in the art will appreciate that the wireless devices 310, 320 may in fact be in communication with different Wi-Fi access points via respective WLAN links 361, 365.

According to various aspects, in addition to the communicating with the cellular base station 340 via WWAN links 341, 345 and communicating with the Wi-Fi access point 360 via the WLAN links 361, 365, the wireless devices 310, 320 may communicate with one another directly over an out-of-band D2D connection 350 in the event that the wireless devices 310, 320 are located in sufficient proximity to one another. For example, when the wireless devices 310, 320 are within a range up to approximately 500 meters, the wireless devices 310, 320 may use the WWAN radios 313, 323 to form a D2D link over LTE-Direct. Furthermore, if the wireless devices 310, 320 are within sufficient range to discover one another via the WLAN radios 315, 325, the wireless devices 310, 320 may form a D2D link over Wi-Fi Direct. In other examples, the wireless devices 310, 320 may form a D2D link using the Bluetooth radios 317, 327 if the wireless devices 310, 320 are within an operating range ranging from a few meters to a few tens of meters or using the NFC radios 311, 321 if the wireless devices 310, 320 are within each other's near field (e.g., about ten centimeters or less). However, in the event that the wireless devices 310, 320 are both associated with the same user and run respective applications 318, 328 (e.g., an email application) that are associated with the same user name and credentials, existing synchronization algorithms and implementations typically involve each wireless device 310, 320 individually performing a synchronization procedure with a corresponding application server 390 without utilizing or considering the fact that the latest account data 319, 329 associated with the application 318, 328 may be available on the other device in proximity, which tends to be an inefficient approach for several reasons. As such, where the wireless devices 310, 320 are located in sufficient proximity, the wireless devices 310, 320 may execute one or more service discovery protocols to discover one another and communicate directly over the out-of-band D2D connection 350 based on appropriate service data 319, 329 that may be stored at each respective wireless device 310, 320.

For example, LTE-Direct (LTE-D, sometimes referred to as "LTE-Advanced") is a proposed 3GPP (Release 12) D2D solution for proximate discovery, wherein LTE-D dispenses with location tracking and network calls by directly monitoring for services on other LTE-D devices within a large range (~500 m, line of sight) to concurrently detect services in proximity. Accordingly, LTE-D is a D2D solution that enables service layer discovery and D2D communication, wherein applications 318, 328 on LTE-D wireless devices (e.g., wireless devices 310, 320) can instruct LTE-D to monitor for application services on other devices and announce locally available services (for detection by services on other LTE-D devices) at the physical layer. As such, the client application(s) 318, 328 may be notified when a match to an establish "monitor" is detected. For example, the application(s) 318, 328 can establish a monitor for "synchronization events" and the LTE-D discovery layer can wake-up the application(s) 318, 328 when a synchronization-related LTE-D expression is detected. LTE-D is thus a distributed discovery solution that may not require a centralized database to identify relevant matches, which are instead autonomously determined at the device level by transmitting and monitoring for relevant attributes.

In another example, Wi-Fi Direct (WFD) is a device-to-device (D2D) specification developed under the Wi-Fi Alliance (WFA), which provides a means that IEEE 802.11 devices can use to discover and communicate directly with each other without using a central node, such as an access point (AP) or a base station (BS). WFD may allow Wi-Fi devices, or peer wireless devices, to address usage models that are traditionally covered under Bluetooth and ad hoc networks, such as an independent basic service set (IBSS). WFD addresses device discovery, service discovery, security, user set-up, and cross-connection to the infrastructure network. WFD generally has a range substantially equivalent to standard Wi-Fi, security using WPA2 (e.g., Advanced Encryption Standard (AES) encryption), three 20 MHz channels in the 2.4 GHz band and twenty-five 20 MHz channels in the 5 GHz band, device authentication and enrollment with Wi-Fi Protected Setup (WPS) (or Wi-Fi Simple Configuration (WSC)), an IP-address-based protocol, service advertisement, power management allowing both devices to sleep, one-time or persistent connections, and concurrency with infrastructure networks (i.e., networks using a central node). Accordingly, in WFD, a group owner (GO) may act as a master peer device and may support connections with multiple client peer devices. The GO has functionality similar to an access point in a traditional system, except that the GO can enter a power saving state. A WFD peer group typically has a single basic service set identifier (BSSID), a single GO, one or more client peer devices, and a single group identifier, which may be a one-time group or a persistent group identifier.

Figure 4:
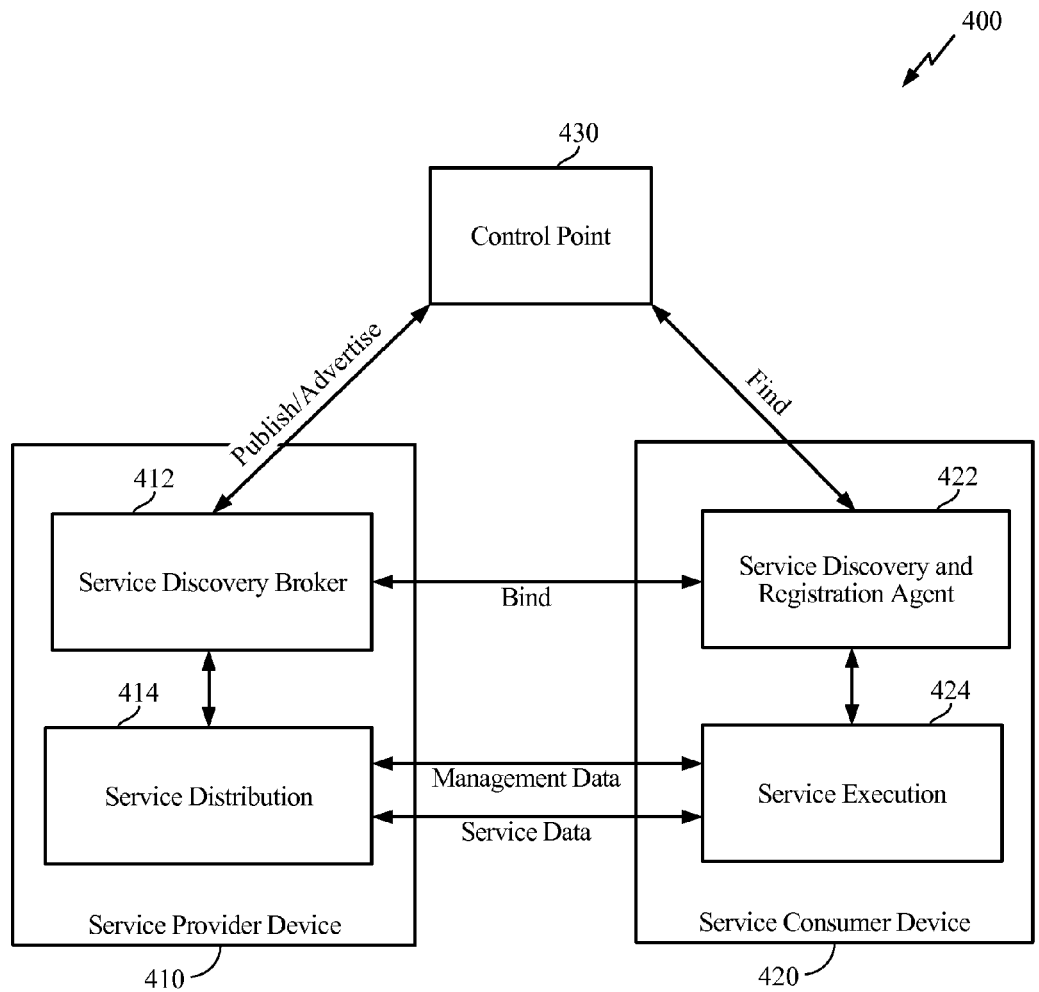
FIG. 4 illustrates an exemplary wireless network architecture in which two or more peer wireless devices may communicate over an out-of-band D2D connection according to one or more service discovery protocols, according to various aspects.

Accordingly, FIG. 4 illustrates an exemplary wireless network architecture 400 in which two or more peer wireless devices may communicate over an out-of-band D2D connection according to one or more service discovery protocols. In general, the wireless network architecture 400 shown in FIG. 4 will be described herein in relation to service discovery procedures used in Wi-Fi Direct (WFD). However, those skilled in the art will appreciate that such description is for illustration purposes only and that the issues involved in the service discovery framework shown in FIG. 4 may likewise apply to service discovery procedures used in other D2D technologies.

According to various aspects, the wireless network architecture 400 shown in FIG. 4 may support service discovery protocols used in various application service platforms, where an application service platform (ASP) may generally refer to a software service or library that implements the functions that applications and services need to establish and communicate over a session between a service provider device 410 and a service consumer device 420. For example, applications and/or use cases built on the one or more service discovery protocols may include mirroring (or screen sharing), streaming video, streaming audio, remote video and/or graphics rendition, remote audio and/or audio rendition, remote sensing, remote control, file transfer, and so on. In various embodiments, as will be described in further detail herein, the service provider device 410, the service consumer device 420, and a control point 430 may exchange various service discovery messages and other signaling messages to support announcements and inquiries, composition and mediation, control, presentation, group management, addressing control, quality of service (QoS) and/or quality of experience (QoE) with respect to various applications/use cases.

More particularly, assuming that the service provider device 410 supports one or more peer-to-peer (P2P) services, a service discovery broker 412 associated with the service provider device 410 may publish one or more service advertisements to provide information about the one or more P2P services such that a service seeker on another device (e.g., the service consumer device 420) can search for, find, and initiate an ASP session with the ASP on the service provider device 410. For example, according to various embodiments, the service advertisements may include a service name, an identifier associated with the service provider device 410, and one or more pointers to more detailed information about the one or more services (e.g., a protocol-specific service description). The control point 430 may then discover and review the one or more service advertisements to learn about the service provider device 410 and the capabilities associated therewith, retrieve the appropriate device and service descriptions, send actions to the service discovery broker 412, poll the service discovery broker 412 for service state variables, and receive events from the service discovery broker 412. As such, the control point 430 may be configured to provide a registry that maintains service descriptions, device information, and/or other suitable information to facilitate service-specific P2P sessions in the wireless network architecture 400. For example, in various embodiments, a service discovery and registration agent 422 may periodically solicit information from the control point 430 to learn services that are available in the wireless network architecture 400, while the service discovery broker 412 may expose controls and status associated with the available services.

As such, according to various aspects, the control point 430 may use one or more service descriptions to send control messages (or actions) to the service discovery broker 412 on the service provider device 410 and/or the service discovery and registration agent 422 on the service consumer device 420, which may then return one or more action-specific corresponding values. With respect to events, the control point 420 may subscribe to receive service descriptions or actions to change service variables that model service states, whereby the service provider device 410 and/or the service consumer device 420 may send event messages to update one or more state variables and current values associated with the state variables. Accordingly, when the service consumer device 420 finds and uses the one or more services offered at the service provider device 410, management data and service data may be exchanged between a service distribution module 414 on the service provider device 410 and a service execution module 424 on the service consumer device 420. For example, once a service session has been bound or otherwise established between the service discovery broker 412 and the service discovery and registration agent 422, the management data exchanged between the service distribution module 414 and the service execution module 424 may define the service invocation methods, input resolutions, and/or any additional dependencies needed to perform actual service work and return data.

Accordingly, in the description provided herein, service discovery may generally refer to the system architecture, methods, algorithms, and protocols that enable the service consumer device 420 to discover one or more services that match one or more required conditions associated with a service to be consumed in the appropriate system architecture without prior configuration. For example, one known service discovery architecture is Zero-configuration networking (Zeroconf), which resolves addressing, naming, service discovery, and automatic device and service configuration across heterogeneous networks without needing any centralized entity as in the Domain Name Service (DNS) and Dynamic Host Configuration Protocol (DHCP). In particular, devices that support Zeroconf use Multicast DNS (mDNS) to store service information in DNS resource records, whereby Zeroconf employs DNS Service Discovery (DSN-SD) such that standard DNS programming interfaces, servers, and packet formats can be used to browse the network and find available services. To that end, Zeroconf requires devices to support publication to expose a service, discovery to enable browsing for available services, and resolution to translate service name nomenclatures to actual logical addresses and port numbers. In that sense, considerations applicable to any service discovery architecture may include the relevant service discovery objectives (e.g., providing a common description language, service information storage, and mechanisms to enable searching for services). In addition, the considerations may relate to how services are administered (e.g., updating service directories due to changes to service descriptions, network topologies, etc.), service information storage classification (e.g., centralized, unstructured distributed, structured distributed, flat, hierarchical, hybrid, etc.), as well as service description access and service discovery methods. For example, in centralized and structured distributed storage environments, service description access may be controlled through a directory node that may be identified and required to publish advertisements and requests, whereas structured distributed storage systems may have directory nodes relay service discovery messages to other directory nodes according to the applicable overlay structure. In another example, direct service access may be addressed to the directory nodes or disseminated in the network. With respect to service discovery methods, passive (or push) models may allow agents and brokers to passively receive announcements about devices and available services, whereas agents and brokers may actively interrogate or inquire about devices and available services in architectures that employ active (or pull) models.

Furthermore, with respect to performance, various additional service discovery considerations may exist. For example, functional issues may include, without limitation, service selection, usage and QoS/QoE, security/privacy (e.g., authentication, authorization, trust, confidentiality, integrity, non-repudiation, etc.), network type (e.g., wired, wireless, client density, size, bandwidth, etc.), and device capabilities. In the QoS/QoE context, specific performance issues may include network scalability, group communication, load balancing and query efficiency (e.g., more directory nodes and service groupings, caching to minimize overloading nodes, load balancing and load distribution to new devices, hierarchical structures, distributed hash indexing, overlay structure optimization, and service description aggregation) as well as fault tolerance, timing and synchronization, mobility support, and resource-aware optimization (e.g., power and battery optimizations, network bandwidth optimizations, etc.). Accordingly, depending on the application(s) and/or use case(s) supported in the service discovery architecture, a wireless application datapath associated with a particular service can comprise many ad-hoc devices that can be expected to have unequal capabilities, processing densities, storage capacities, connection and power performance profiles, etc. Furthermore, because any device can operate autonomously and without awareness of other devices, operational dependencies and required collaboration among different devices will typically be validated and resolved per-application and/or use case such that a collaborative and distributed (unstructured) service discovery framework may best enable all essential features.

Figure 5:
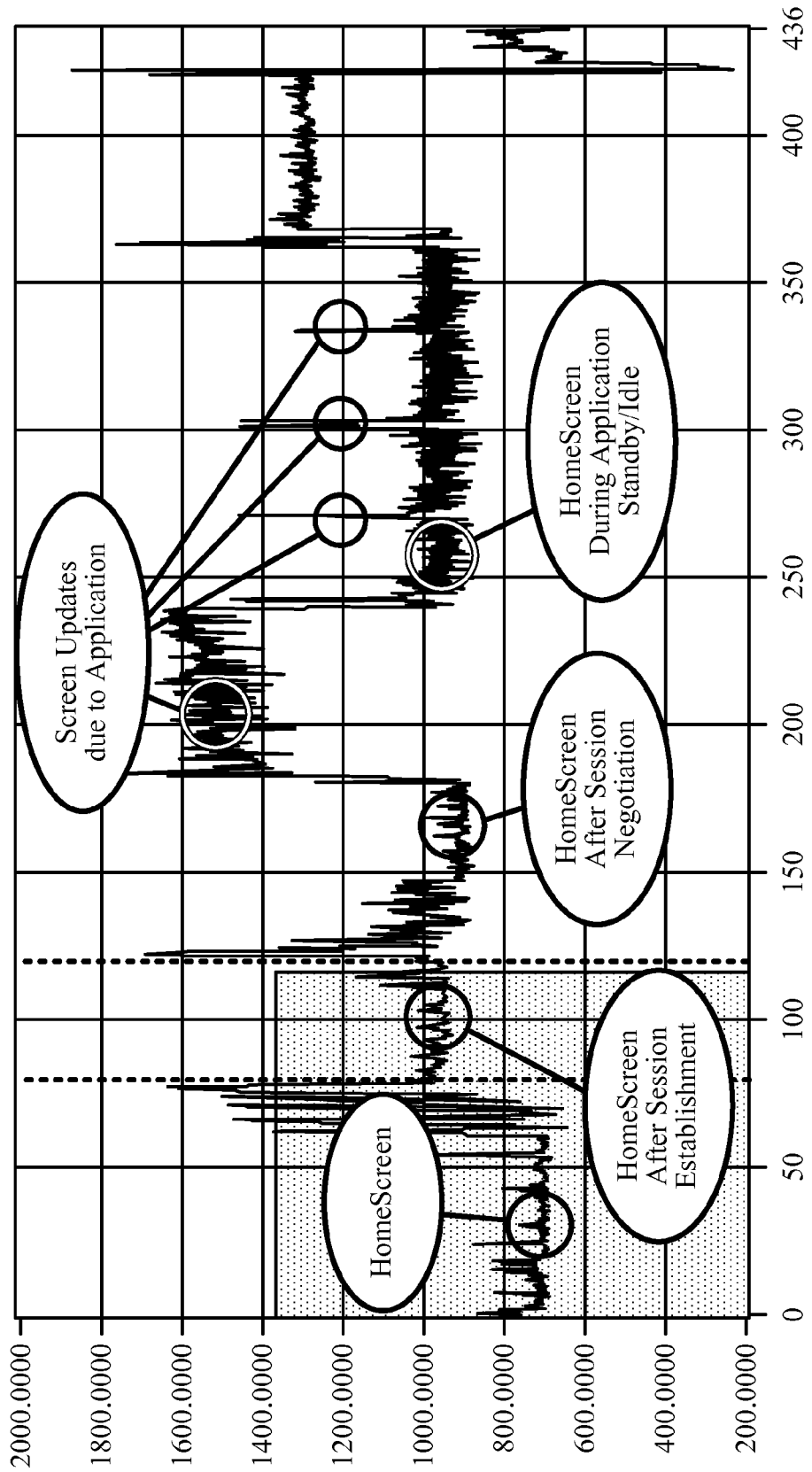
FIG. 5 illustrates an exemplary power profile at a wireless device configured to communicate over an out-of-band D2D connection, according to various aspects.

However, in order to support such a collaborative and distributed (unstructured) service discovery framework, each peer device would have to be maintained in an always-on state, which can lead to significant performance issues. For example, FIG. 5 illustrates an exemplary power profile at a wireless device that communicates over an out-of-band D2D connection to provide and/or consume one or more P2P services. In particular, the example power profile shown in FIG. 5 may apply to a wireless device that communicates using an 802.11ac Wi-Fi transceiver, where the vertical axis shows milliamps (mA) consumed at 4.0 volts DC as a function of time as shown on the horizontal axis. As shown in FIG. 5, power consumed while the wireless device is on a home screen (and prior to establishing a wireless session) is approximately 800 milliamps (mA), wherein the home screen power consumption jumps to around 1000 mA after session establishment and power consumption stays at or above that level even during standby/idle periods when no wireless traffic exists, which amounts to ~1 W in static power consumption. As such, depending on the service information storage type, service description access, and service discovery methods, occasional service discovery messaging causes the wireless device to maintain various components in a main wireless application datapath in an always-on state, leading to substantial unnecessary power consumption. For example, many service discovery messages have relatively small payloads (e.g., only a few bytes), which may not require the substantial processing resources provided in the main wireless application datapath. As such, the various aspects and embodiments described herein introduce a smart co-processor or other processing component(s) having a low-power profile into the main wireless application datapath such that the low-power co-processor can assume certain processing functions that the components in the wireless application datapath would typically perform and thereby reduce the overall power consumption associated with service discovery messaging. Furthermore, as will be described in further detail herein, the low-power co-processor may be configured to selectively engage the components in the wireless application datapath when needed such that the components that consume more power are only utilized to perform more intensive processing tasks or when otherwise required.

Figure 6:
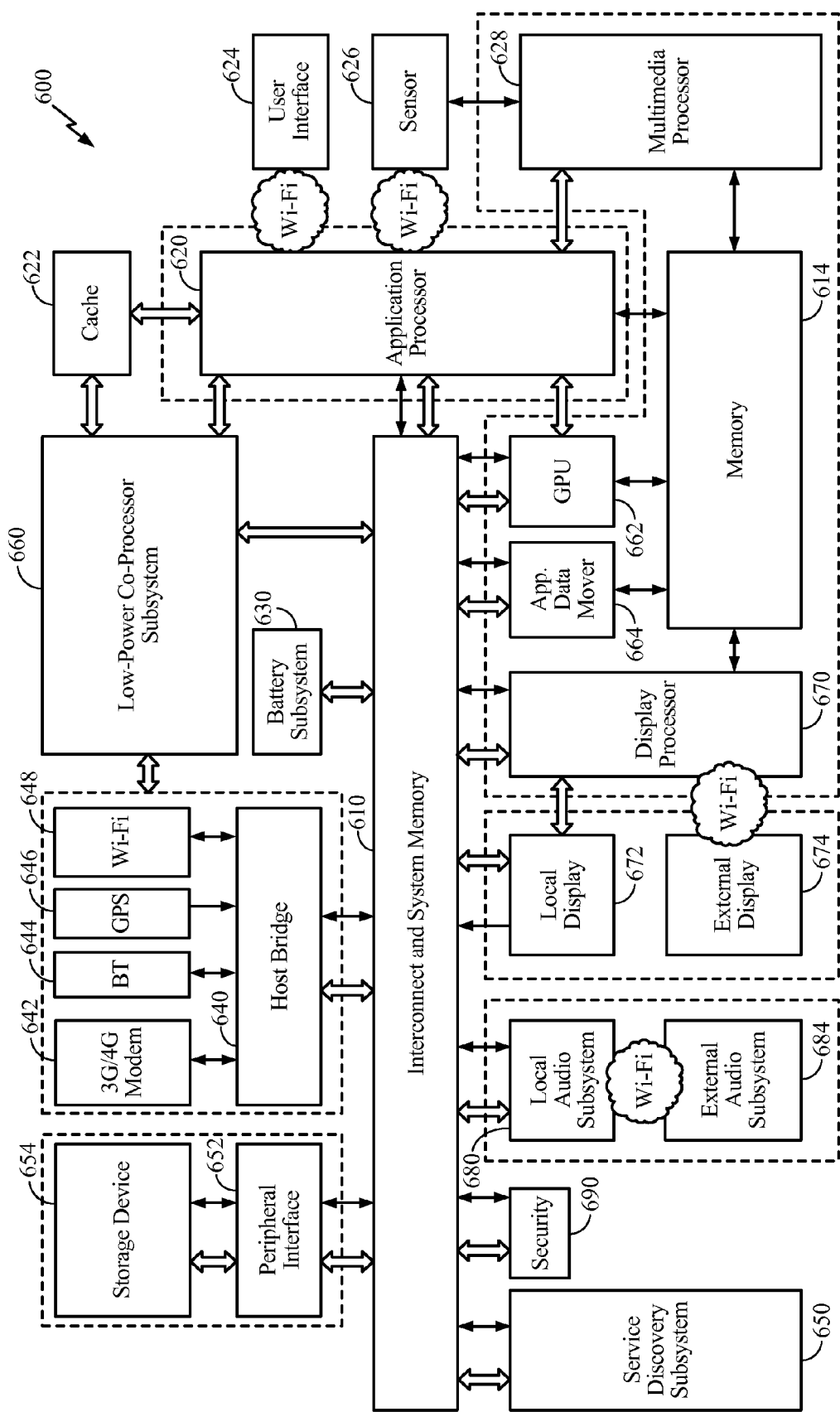
FIG. 6 illustrates an exemplary wireless device that has a low-power co-processor disposed in a main wireless application datapath to support one or more service discovery processing tasks, according to various aspects.

More particularly, according to various aspects, FIG. 6 illustrates an exemplary wireless device 600 that may have a low-power co-processor subsystem 660 disposed in a main wireless application datapath to assist with one or more service discovery processing tasks and thereby optimize service discovery power consumption and/or other service discovery processing tasks associated with a wireless service platform. As such, the wireless device 600 shown in FIG. 6 may correspond to a service provider device, a service consumer device, or any other suitable device in a wireless application datapath associated with one or more services that are provided between peer devices. For example, in various embodiments, the wireless device 600 may include a display processor 670 that can encode or otherwise process video data to present on a local display 672 and/or an external display 674 on an external device. In certain use cases, the display processor 670 may process the same video data to display on both the local display 672 and the external display 674, or the display processor 670 may alternatively only process video data to display on the local display 672 or the external display 674. In a similar respect, the wireless device 600 may include a local audio subsystem 680 that can process audio data to present through local audio output mechanisms (e.g., internal speakers, a headphone interface, etc.) and/or an external audio subsystem 684, wherein the local audio subsystem 680 may process the same audio data to present locally and through the external audio subsystem 684 or alternatively only process audio data to present locally or through the external audio subsystem 684. Accordingly, in various embodiments, the wireless device 600 may include a service discovery subsystem 650 configured to manage various aspects associated with providing and/or consuming services associated with one or more peer devices, which may involve coordination with the display processor 670 and associated components to support services that relate to mirroring, screen sharing, streaming video, remote video/graphics rendition, etc., coordination with the local audio subsystem 680 and associated components to support services that relate to streaming audio, remote audio rendition, coordination with a sensor platform 626 to support services that relate to remote sensing, and so on.

Furthermore, in various embodiments, the service discovery subsystem 650 may be configured to coordinate various tasks that relate to device discovery, which may include discovering or otherwise determining Media Access Control (MAC) addresses or other suitable identifying information associated with one or more discovered peer devices, location coordinates associated with such peer devices, P2P services available on the discovered peer devices, and/or other suitable configuration information pertaining to any discovered peer devices. In various embodiments, the service discovery subsystem 650 may be configured to store the information pertaining to the discovered peer devices in local storage, a cache 622, a memory associated with the low-power co-processor subsystem 660, and/or any suitable combination thereof. For example, in various embodiments, the information pertaining to each discovered peer device may be stored in a table, which may include a peer device field to store a name associated with each discovered peer device, an address field to store the MAC address associated with each discovered peer device, a coordinate field to store the location coordinates associated with each discovered peer device, a service field to store information about the P2P services (if any) that are available on the discovered peer device, and one or more hash values that correspond to service query strings that identify the services available at each peer device.

According to various embodiments, the service discovery subsystem 650 may further coordinate various tasks that relate to service discovery, which may include discovering or otherwise determining one or more service descriptions that are associated with services available on the wireless device 600 and/or the available services on any discovered peer devices. For example, service discovery protocols generally rely on protocol-specific service descriptions (or specifications) that are passed between peer endpoints (e.g., according to a service_information parameter that provides detailed information about a specific individual service). As such, in various embodiments, a peer device may discover other peer devices via a Scan phase in which a scanning peer device seeks to discover existing P2P networks, which may have a group owner (GO) send out beacons that may be heard at a peer device listening to all available channels. In that context, the Scan phase may include an Active Scan or a Passive Scan, wherein an Active Scan may involve the peer device sending probe requests on all available channels and soliciting probe responses from an access point or a GO, while a peer device conducting a Passive Scan may dwell on all channels and listen for beacons. Alternatively, in various embodiments, a peer device may discover other peer devices via a Find phase in which the scanning peer device seeks to discover other peer devices that have not already formed a P2P group. In that context, the Find phase may include a Search state and a Listen state, wherein the Search state may comprise a peer device transmitting one or more probe request frames on each social channel (e.g., channel 1, 6, and 11 in the 2.4 GHz band). In the Listen state, the peer device may wait on a specific social channel (e.g., the Listen channel) and listen for probe requests having a certain type (e.g., a specific requested service). The peer device may then filter the requests based on the desired device and/or service type to identify one or more matching probe responses that may be sent with the appropriate service description in addition to any other information suitable to consume the service. For example, many service discovery protocols use an attribute-value structure to format the service description according to a human-readable and machine-readable template document, while the Bluetooth Service Description Protocol (SDP) contains all information about a service is within a service record (e.g., an attribute list) and others use hierarchical attribute-value pairs, XML-based ontologies, object-oriented paradigms, etc. In any case, the service discovery subsystem 650 may be configured to store the service description(s) pertaining to any discovered services available on the wireless device 600 and/or one or more peer devices in local storage, the cache 622, the memory associated with the low-power co-processor subsystem 660, and/or any suitable combination thereof. As such, in various embodiments, the service discovery subsystem 650 may be configured to appropriately distribute the service description(s) among interested components on the wireless device 600 such that service-specific rules to define the processing tasks to be carried out on the low-power co-processor subsystem 660 and/or the application processor 620 in the main wireless application datapath can be determined, applied, and dynamically tuned to optimize performance associated with the wireless device 600.

According to various aspects, the wireless device may include a host bridge 640, which may be dedicated to communication purposes, included in a general-purpose processor associated with the wireless device 600, or any suitable combination thereof. In various embodiments, the host bridge 640 may be configured to manage a 3G/4G cellular modem 642, a Bluetooth (BT) radio 644, a global positioning system (GPS) 646 receiver, and a Wi-Fi radio 648 in addition to any other modules and/or units that the wireless device 600 may use to communicate over wired and/or wireless interfaces. Furthermore, in various embodiments, the Wi-Fi radio 648 may include a Wi-Fi transceiver that operates according to conventional Wi-Fi protocols (e.g., an 802.11n/802.11ac transceiver) and/or an independent high performance Wi-Fi transceiver (e.g., an 802.11ad transceiver). In various embodiments, the host bridge 640 may be configured to establish a session with one or more peer devices using one or more components in a main wireless application datapath, which may further include an interconnect and system memory 610 and an application processor 620. However, as will be described in further detail below, the low-power co-processor subsystem 660 may be disposed in the wireless application datapath to detect service discovery messages, events, and signals in incoming packets, wherein the low-power co-processor subsystem 660 may have sufficient memory to store outgoing messages and related schedules to transmit the outgoing messages via the Wi-Fi radio 648, the BT radio 644, the 3G/4G cellular modem 642, etc. As such, the low-power co-processor 660 may be used to offload various service discovery tasks from the high-power and high-bandwidth components in the wireless application datapath, which can therefore enter a low-power state until needed to carry out more intensive processing tasks.

According to various embodiments, the wireless device 600 may further include a storage device 654 coupled to the interconnect and system memory 610 through a peripheral interface 652. For example, storage device 654 may comprise a flash drive, a Universal Serial Bus (USB) drive, an SD card, or any other suitable external storage device. In addition, data stored in the storage device 654 may be received from storage or in real-time from a private network or a public network (e.g., the Internet) via the host bridge 640. In one embodiment, the wireless device 600 may further include an application data mover 664 that may move data from the storage device 654 to local memory 614 such that the application processor 620 and/or the low-power co-processor subsystem 660 can access the data more easily when executing one or more appropriate applications. Furthermore, the application processor 620 may be coupled to the cache 622, which may store frequently accessed data. In addition, the wireless device 600 may include a graphics processing unit 662 that can perform any suitable graphics processing that applications running on the application processor 620 may require. Furthermore, the wireless device 600 may include one or more multimedia processors 628 that can provide encoding, decoding, acceleration, and/or other multimedia processing on multimedia content obtained from network sources (e.g., the Internet), from sensors in the wireless device 600 (e.g., a built-in camera) and/or a sensor platform 626, and/or any other suitable multimedia source. Furthermore, to present media data on an external sink device, the wireless communication device 600 may include a security module 690 that may determine and apply any security information necessary to ensure that media data packets are securely transmitted to the external sink device.

Additionally, the wireless device 600 may include a battery subsystem 630, which may be configured to monitor the status associated with a battery in the wireless device 600. For example, according to various embodiments, the battery subsystem 630 may store status information that reflects whether the wireless device 600 has a wall-plugged power source or is using an internal battery as well as the remaining power available on the internal battery (if in use). In various embodiments, the status information relating to the battery may be presented on the local display 680 (e.g., using a small battery icon, lights or sounds to indicate different battery conditions, etc.) and used to configure the functions that are permitted on the wireless device 600 and/or the functions to be offloaded to the low-power co-processor system 660. As such, in various embodiments, the service-specific rules mentioned above can be dynamically defined and/or subsequently redefined or otherwise tuned based on platform and application-specific use-case contexts to maximize battery life. For example, if the wireless device 600 corresponds to a wrist-wearable device, the battery subsystem 630 may can negotiate and control the services that are to be supported on the wireless device 600, the functions that are permitted on the wireless device 600, etc. according to battery health, a battery charge state, and/or other suitable battery-related parameters (e.g., only tell time, show messages, provide speaker functions, etc. when battery health and/or available power is less than a threshold value, disable flash photography when battery health and/or available power is critically low such that a camera cannot be launched, etc.). In general, the battery subsystem 630 may update the status information associated with the battery almost continuously to reflect an accurate battery status. In addition, the battery subsystem 630 may control a clock module that includes various clocks and/or other suitable circuitry used to control functions performed in the wireless device 600. Furthermore, as noted above, the Wi-Fi radio 648 may include multiple independent Wi-Fi transceivers that can offer different performance levels. However, because the different performance levels may have different impacts on the internal battery, wherein the high-performance Wi-Fi transceiver may generally consume more power, the wireless device 600 may implement a demand-based Wi-Fi network control framework to ensure that the high-performance Wi-Fi transceiver will not be used while the low-power co-processor subsystem 660 is active in order to preserve the power optimizations provided therewith, as described in further detail herein.

According to various aspects, the low-power co-processor subsystem 660 may have capabilities to detect one or more service discovery events and signals (e.g., rules and alarms) in incoming packets and sufficient memory to store outgoing messages and related schedules such that the low-power co-processor subsystem 660 can assume functions typically performed with components that consume substantially more power (e.g., the host bridge 640, the interconnect and system memory 610, the main application processor 620 configured to execute a high-level operating system, etc.). For example, according to various aspects, the low-power co-processor subsystem 660 may independently inspect incoming packets that are received via the Wi-Fi radio 648, the BT radio 64, the 3G/4G modem 642, etc. according to various dynamically configurable "wake-up" rules such that the low-power co-processor subsystem 660 may handle certain processing tasks that would otherwise be performed using the components in the main wireless application datapath. Furthermore, the low-power co-processor subsystem 660 may selectively engage the components in the main wireless application datapath as needed depending on whether the wake-up rules are triggered (e.g., where the inspected packets have a payload above a threshold level, an external message to wake-up the components in the main wireless application datapath is received, one or more packets include a binary string that matches one or more wake-up rules, etc.). Furthermore, because the wireless device 600 may be expected to respond to service discovery inquiries and exchange ping and/or keep-alive messages with other peer devices in order to preserve connections/associations therewith and thereby maintain constant/stateful operations during standby/idle states, the low-power co-processor subsystem 660 may terminate the sockets for such messaging. Accordingly, offloading various service discovery tasks to the low-power co-processor subsystem 660 may allow the more power-hungry components in the main wireless application datapath to remain in a low-power state (e.g., sleep mode) as much as possible. Similarly, because the wireless device 600 may be expected to announce/advertise services available thereon and publish real-time events and signals with minimum latency in certain use cases (e.g., remote control and remote sensing applications), the low-power co-processor subsystem 660 may act as a proxy for the components in the main wireless application datapath to optimize processing efficiency (e.g., power consumption). Moreover, the low-power co-processor subsystem 660 may be configured to pre-process and/or trap certain commands and timing-critical messages (e.g., synchronization and interrupt look-ups) to expedite or otherwise optimize processing that may eventually be finished at the main application processor (once woken from the low-power state).

Figure 7A:
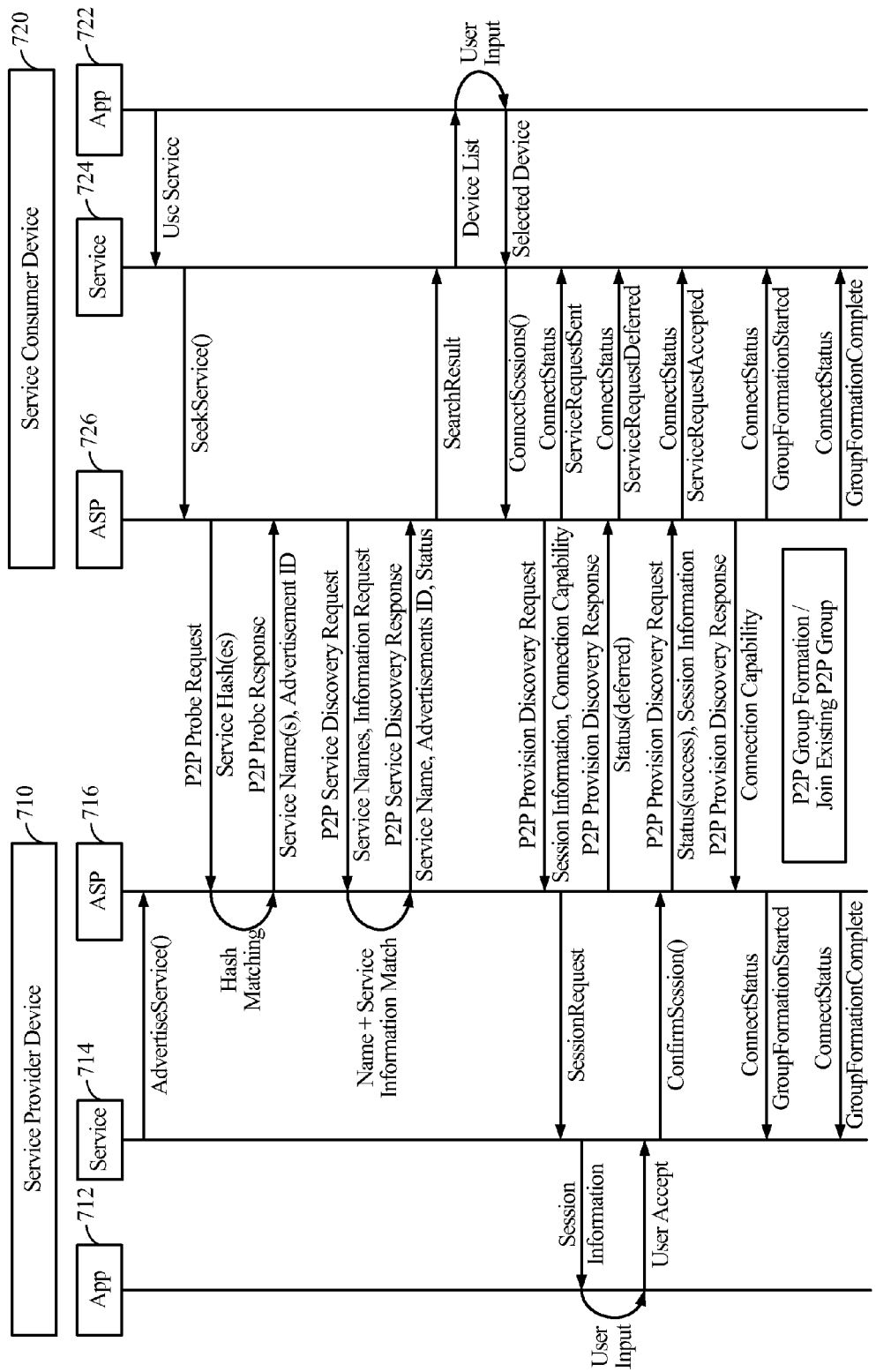
FIG. 7A and FIG. 7B illustrate exemplary device discovery and service discovery call flows between service provider and service consumer peer devices to establish an out-of-band D2D connection between the peer devices, according to various aspects.
Figure 7B:
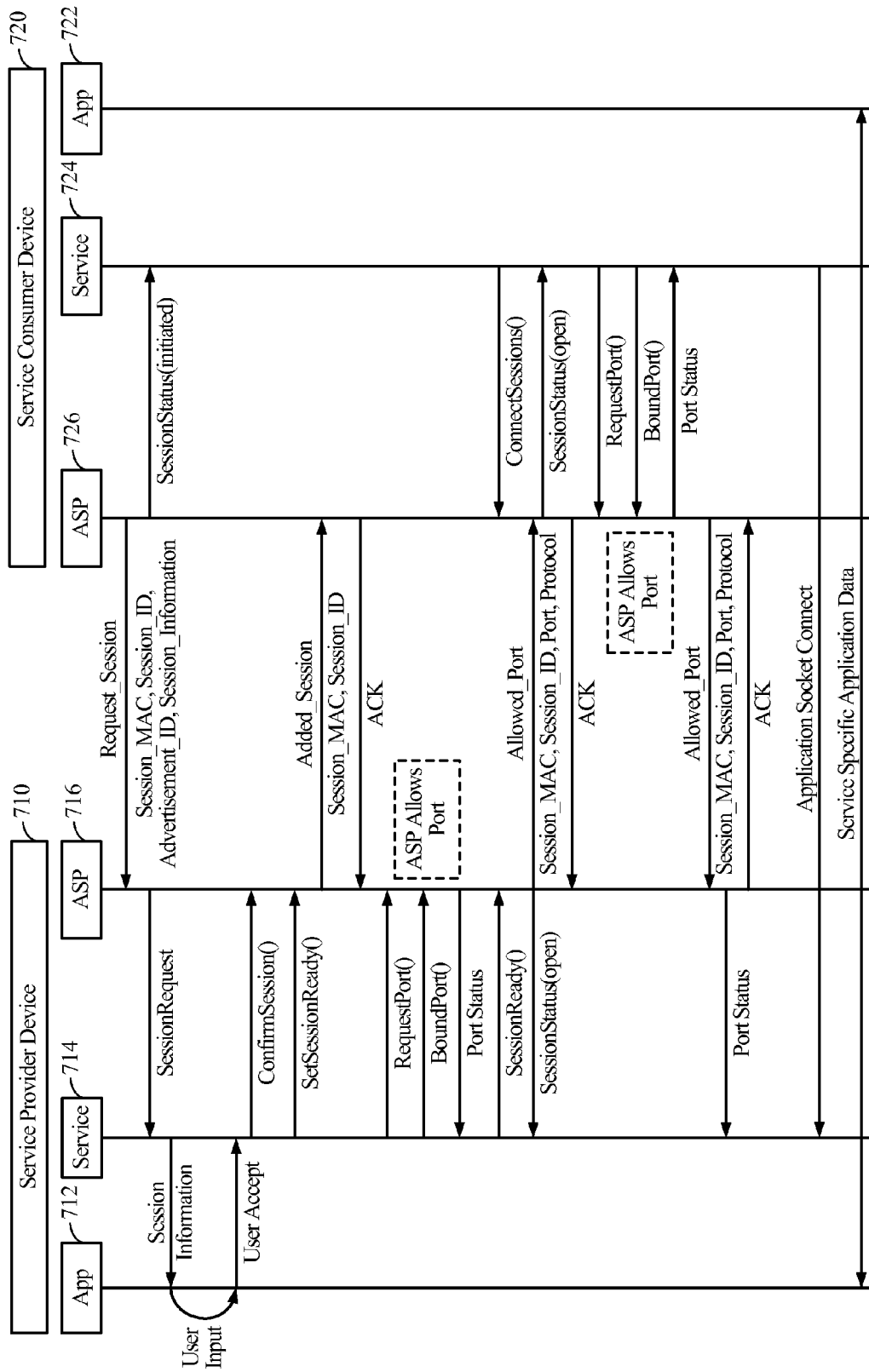

According to various aspects, FIG. 7A and FIG. 7B illustrate exemplary device discovery and service discovery call flows in which a service provider device 710 and a service consumer device 720 may exchange various messages to establish an out-of-band D2D connection used to provide an available service 714 on the service provider device 710 to the service consumer device 720. In general, the following description with respect to FIG. 7A-7B may use certain terminology defined in the Wi-Fi Alliance Peer-to-Peer (P2P) Specification. However, those skilled in the art will appreciate that such description is for illustration purposes only and that the concepts described herein may suitably apply to device discovery and service discovery procedures that are used in other D2D technologies. For example, according to various aspects, the service provider device 710 may execute an application 712 to make the service 714 on the service provider device 710 available to one or more peer devices, such as service consumer device 720. In a similar respect, the service consumer device 720 may execute an application 722 that may request a service 724, which may correspond to the available service 714 on the service provider device 710. Accordingly, the service provider device 710 and the service consumer device 720 may each have a local application service platform (ASP) 716, 726, which may refer to a software service or library that implements various functions needed to establish a session in which the service consumer device 720 utilizes the available service 714 on the service provider device 710. For example, in various embodiments, the functions implemented via the local ASPs 716, 726 on the service provider device 710 and the service consumer device 720 may include device discovery, service discovery, session management, connection topology management, and security, among others.

According to various aspects, the call flow shown in FIG. 7A may generally be performed during a pre-association state where no device discovery and/or service discovery procedures have already been carried out between the service provider device 710 and the service consumer device 720. As such, the call flow shown in FIG. 7A may be used to make the service 714 provided on the service provider device 710 available to the service consumer device 720 and establish a direct wireless connection between the service provider device 710 and the service consumer device 720 such that the service consumer device 720 may utilize the service 714 available on the service provider device 710. In particular, the ASP 716 on the service provider device 710 may receive an AdvertiseService( ) message from the available service 714, wherein the AdvertiseService( ) message may provide information about the service 714 such that a service seeker on another device (e.g., service consumer device 720) may discover and initiate a session with the ASP 716 on the service provider device 710. For example, in various embodiments, the AdvertiseService( ) message may include parameters to specify a name associated with the service 714, detailed information about the specific service 714 that can be used during service discovery (e.g., a service description or service_information parameter), a status parameter to specify whether or not the service 714 is available for use at the time that the ASP 716 calls the AdvertiseService( )method, any network configuration parameters associated with the service 714, etc. As such, in response to the application 722 on the service consumer device 722 indicating a request to use service 724, the service 724 may send a SeekService( ) message to the ASP 726, wherein the SeekService( ) message may provide information that the ASP 726 can use to search for services on peer devices (e.g., the service provider device 710). For example, in various embodiments, the SeekService( ) message may include parameters to specify a service name to be searched (e.g., a full service name, a service name prefix, etc.), whether to conduct an exact search in which case the ASP 726 may send a hash value corresponding to the service name in a subsequent Probe Request frame (otherwise the ASP 726 may send a hash value corresponding to a service domain to search for all peer devices that support any services in the service domain), a network address parameter to indicate whether to limit the search to a device with a specific MAC address or search all peer devices in proximity, and/or an optional service information request parameter to request additional information typically used in a service discovery request/response exchange.

According to various aspects, the ASP 726 on the service consumer device 720 may then transmit a P2P Probe Request frame, which may include one or more service hash(es) to indicate the desired service. In response to the ASP 716 at the service provider device 710 detecting the P2P Probe Request frame, the ASP 716 may determine whether the service hash(es) included therein match a hash associated with the service 714 (or any other services available on the service provider device 710). Assuming that the service hash(es) in the P2P Probe Request match the hash associated with the service 714, the ASP 716 may then transmit a P2P Probe Response with the name associated with the service 714 in addition to an advertisement ID that the ASP 716 assigns to uniquely identify the advertisement(s) on the service provider device 710 for manipulation by the service 724 that requested the advertisement, wherein the advertisement ID may also be used in subsequent messaging to indicate status changes associated with the service 714, manage connections associated with the service 714, and/or other events and controls associated with the service 714. The ASPs 716, 726 may then exchange P2P Service Discovery Request and P2P Service Discovery Response Frames to exchange the service name(s) and detailed service-specific information, at which time the ASP 726 may indicate the search result to the service 724. The service 724 may then return a device list to the application 722 and a user input may select the service provider device 710 from the device list. The service 724 may then send a ConnectSessions( ) message to the ASP 726, which may result in a P2P Provision Discovery Request and P2P Provision Discovery Response exchange between the ASPs 716, 726. In response to a user at the service provider device 710 confirming the session, the ASP 716 may return a success message along with session information to the ASP 726 at the service consumer device 720, which may exchange connection capabilities with the service provider device 710. At that point, the service consumer device 720 and the service provider device 710 may form a P2P group, or the service consumer device 720 may alternatively join an existing P2P group that the service provider device 710 previously formed.

Referring now to FIG. 7B, the call flow shown therein may generally be performed during a post-association state where the service provider device 710 and the service consumer device 720 have already formed an existing P2P connection and/or device and service discovery between the service provider device 710 and the service consumer device 720 has already been performed. Accordingly, the ASP 726 at the service consumer device 720 may send a Request_Session message to the ASP 716 at the service provider device 710, wherein the Request_Session message may include a session-specific MAC address, a session ID, an advertisement ID, and session information. The ASP 716 may then send a SessionRequest to the local service 714, which may present the session information to the application 712. In response to the user accepting the session, the service may confirm the session with the ASP 716 and indicate a session ready status to the ASP 716. The ASP 716 may then respond to the ASP 726 at the service consumer device 720 to indicate the session-specific MAC address and the session ID, which the ASP 726 at the service consumer device 720 may acknowledge. The service 714 may then request a port from the ASP 716 and indicate the session MAC address, the session ID, an IP address, TCP/IP port number, and service-specific protocol to bind to the port. In response to the ASP 716 allowing the port, the ASP 716 may indicate the port status to the local service 714 and indicate the allowed port information to the ASP 726 at the service consumer device 720. Accordingly, the service consumer device 720 may perform a similar procedure to bind a port to the service-specific session and indicate the same to the ASP 716 at the service provider device. The respective services 714, 724 at the service provider device 710 and the service consumer device 720 may then connect an application socket such that service-specific application data can be exchanged between the respective applications 712, 722.

According to various aspects, referring to the call flows shown in FIG. 7A-7B and described in further detail above, the service provider device 710 and/or the service consumer device 720 may have a hardware architecture that includes a low-power low-bandwidth co-processor subsystem in addition to a high-power high-bandwidth main processing system, in which case various functions performed using the local ASP 716, 726 may be offloaded to the low-power low-bandwidth co-processor subsystem such that the high-power high-bandwidth main processing system can be placed in a low-power state to optimize power consumption and performance on the service provider device 710 and/or the service consumer device 720. For example, as mentioned above, the low-power low-bandwidth co-processor subsystem may have capabilities to detect one or more service discovery events and signals (e.g., rules and alarms) in incoming packets and sufficient memory to store outgoing messages and related schedules such that the low-power low-bandwidth co-processor subsystem can assume functions typically performed with the high-power high-bandwidth main processing system. As such, in various embodiments, the low-power low-bandwidth co-processor subsystem may inspect incoming packets received from the service consumer device 720 (and/or any other peer devices)

according to various dynamically configurable "wake-up" rules such that the low-power low-bandwidth co-processor subsystem may independently respond to certain incoming messages and selectively engage the high-power high-bandwidth components in the main processing system as needed depending on whether the wake-up rules are triggered (e.g., where the incoming packets have a sufficiently large payload to indicate that the packets relate to service-specific application data rather than service discovery inquiries, where the incoming packets comprise an explicit signal to wake the components in the main processing system, etc.). Furthermore, because the service provider device 710 and the service consumer device 720 may be expected to respond to service discovery inquiries and exchange ping and/or keep-alive messages with one another to preserve the connection/association therebetween (even during standby or idle states), the ASPs 716, 726 may terminate the sockets for such messaging at the low-power low-bandwidth co-processor subsystem on the respective device 710, 720. Accordingly, offloading various device discovery and service discovery tasks to the low-power low-bandwidth co-processor subsystem may allow the service provider device 710 and/or the service consumer device 720 to keep the high-power high-bandwidth components in the main processing system in a low-power state (e.g., sleep mode) as much as possible. Similarly, because the service provider device 710 and the service consumer device 720 may be expected to announce/advertise the services 714, 724 available thereon and publish real-time events and signals with minimum latency in certain use cases, the low-power low-bandwidth co-processor subsystem may act as a proxy for the components in the high-power high-bandwidth main processing system to optimize performance. Moreover, the low-power low-bandwidth co-processor subsystem may pre-process and/or trap certain commands and timing-critical messages (e.g., synchronization and interrupt look-ups) to expedite or otherwise optimize processing that may be finished using the components in the high-power high-bandwidth main processing system (once woken from the low-power state).

Figure 8A:
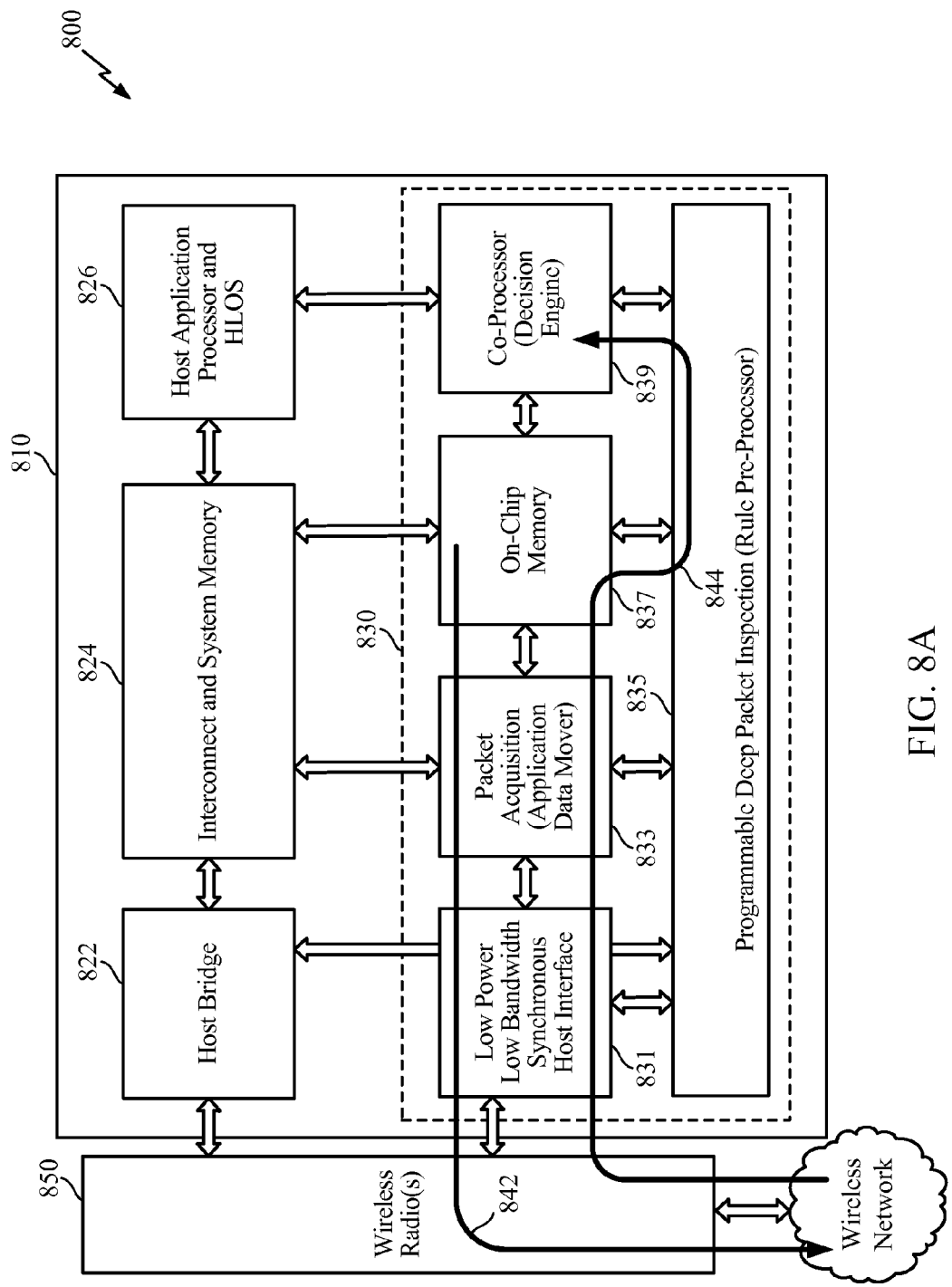
FIG. 8A illustrates an exemplary architecture associated with a wireless device that may operate a low-power low-bandwidth co-processor subsystem disposed in a wireless application datapath according to a look-aside mode, according to various aspects.
Figure 8B:
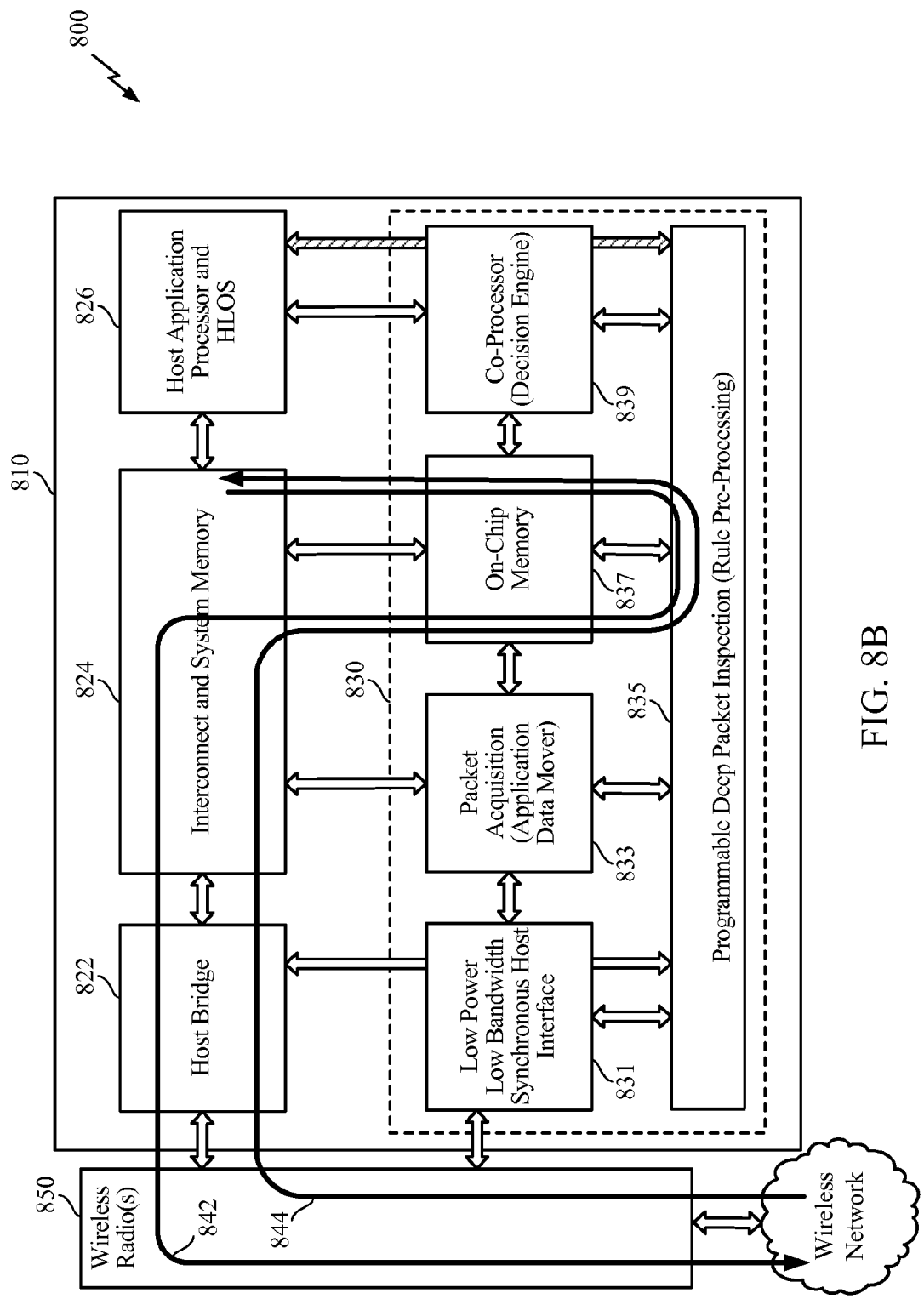
FIG. 8B illustrates an exemplary architecture associated with a wireless device that may operate a low-power low-bandwidth co-processor subsystem disposed in a wireless application datapath according to a bump-in-the-wire mode, according to various aspects.

According to various aspects, FIG. 8A-8B illustrate an exemplary architecture associated with a wireless device 800 that may include a low-power low-bandwidth co-processor subsystem 830 disposed in a wireless application datapath, wherein the low-power low-bandwidth co-processor subsystem 830 may be referred to herein as the "co-processor subsystem" or the like for simplicity. In various embodiments, referring to FIG. 8A and FIG. 8B, the wireless device 800 may include at least one wireless radio 850 that support one or more peer-to-peer (P2P) and/or device-to-device (D2D) technologies (e.g., one or more 802.11 Wi-Fi radios, a Bluetooth radio, a cellular modem that supports LTE-Direct, etc.). As such, the wireless radio(s) 850 may be coupled to a high-power high-bandwidth processing subsystem 810, which may be alternatively referred to herein as the "main wireless processing subsystem" or the like, in addition to the co-processor subsystem 830. In various embodiments, the main wireless processing subsystem 810 may comprise a host bridge 822 that couples the wireless radio(s) 850 to an interconnect and system memory 824 and a host application processor and high-level operating system 826. Furthermore, the co-processor subsystem 830 may comprise a synchronous host interface coupled to the wireless radio(s) 850 in addition to a local on-chip memory 837 configured to store one or more outgoing data packets associated with one or more service discovery tasks offloaded from the main wireless processing subsystem 810 and related schedules to send the one or more outgoing data packets. Furthermore, the co-processor subsystem 830 may include a packet acquisition (application data mover) module 833 that may be configured to move the outgoing data packets for transmission via the wireless radio(s) 850 according to the corresponding schedule(s) and further to move incoming data packets that are received via the wireless radio(s) 850 to the on-chip memory 837.

According to various embodiments, the co-processor subsystem 830 may further comprise a programmable deep-packet inspection (DPI) module 835 configured with one or more dynamic rules to pre-process the incoming data packets that are received via the wireless radio(s) 850, wherein the one or more dynamic rules may be based (at least in part) on a service description associated with one or more service discovery protocols that correspond to one or more services to provide or consume at the wireless device 800. In addition, criteria specified in the one or more dynamic rules may relate to one or more parameters or other information that relates to operating conditions or states associated with the wireless device 800. For example, in various embodiments, the dynamic rules may specify criteria that relate to a battery health state, a battery charge state, synchronization accuracy between timing associated with one or more services provided and/or consumed at the wireless device 800 and a master clock on the wireless device 800, available CPU capacity, available memory reserves, bandwidth requirements, latency requirements, etc. As such, the dynamic rules may generally specify one or more conditions under which to wake one or more component(s) in the main wireless processing subsystem 810 or otherwise invoke processing in the main wireless processing subsystem 810 according to the particular semantics used in the service descriptions associated with the one or more services provided and/or consumed at the wireless device 800. Moreover, in various embodiments, the dynamic rules may optionally further specify the conditions under which to wake one or more component(s) in the main wireless processing subsystem 810 or otherwise invoke processing in the main wireless processing subsystem 810 according to operating conditions or current states on with the wireless device 800.

In that sense, the co-processor subsystem 830 may be configured to transmit scheduled outgoing messages to publish/advertise requirements associated with one or more services provided on the wireless device 800 and/or one or more desired services to be consumed at the wireless device 800 (e.g., whether the wireless device 800, a service consumer peer device, and/or a service provider peer device has speaker(s) or merely display capabilities, whether the provided services and/or the desired services require the service consumer peer device and/or service provider peer device to report ambient temperature, etc.). Accordingly, the co-processor subsystem 830 may be further configured to inspect any incoming data packets to determine whether any service requirements and/or device capabilities specified therein match the one or more available services provided on the wireless device 800 and/or the one or more desired services to be consumed at the wireless device 800, whereby the co-processor subsystem 830 may only awaken or otherwise engage one or more component(s) in the main wireless processing subsystem 810 when one or more incoming packets received from a peer device specify service requirements and/or device capabilities that match an available service provided on the wireless device 800 and/or a desired service to be consumed at the wireless device 800, depending on the service-specific use case(s) and the particular semantics used in the service description(s) associated with the service-specific use case(s).

Accordingly, in various embodiments, the programmable DPI module 835 may initially pre-process the incoming data packets, which may comprise inspecting headers, data parts, or other suitable contents associated with the incoming data packets to collect statistical information (e.g., payload size) and/or determine whether the one or more dynamic rules to invoke processing in the main wireless processing subsystem 810 have been triggered. For example, in various embodiments, the programmable DPI module 835 may determine whether the pre-processed data packets include an "ok-to-sleep" command, in which case the programmable DPI module 835 may notify one or more components in the main wireless processing subsystem 810 that transitioning to a lower power state is permitted (e.g., from an idle/standby to a sleep/dormant state, from the sleep/dormant state to a deep sleep/hibernate state, etc.). In other examples, where the pre-processed data packets include a "no-sleep" command (e.g., an explicit wake signal), the programmable DPI module 835 may notify the components in the main wireless processing subsystem 810 to transition to an active state and move any buffered data to a memory associated with the host application processor 826. In still other examples, if the pre-processed data packets have a payload size above a threshold value such that a buffer associated with the low-power co-processor 839 would become full if stored therein, the programmable DPI module 835 may engage the components in the main wireless processing subsystem 810 and move the buffered data to the memory associated with the host application processor 826, as the buffered data would exceed the available processing capacity within the co-processor subsystem 830. Furthermore, as noted above, the programmable DPI module 835 may perform pattern matching to compare one or more service requirements, capabilities, and/or other suitable information conveyed in the pre-processed data packets to the one or more dynamic rules and engage one or more components in the main wireless processing subsystem 810 in response to matching the information conveyed in the pre-processed data packets to any service-specific conditions that require processing in the main wireless processing subsystem 810. Otherwise, in response to the pre-processed data packets passing all the filters implemented at the programmable DPI module 835, the pre-processed data packets may be stored in the buffer associated with the low-power co-processor 839, which may then further process the incoming data packets.

More particularly, after the appropriate pre-processing has been performed at the programmable DPI module 835, the low-power co-processor 839 may further process the incoming data packets to handle any service discovery tasks that were offloaded from the main wireless processing subsystem 810. For example, the offloaded service discovery tasks may comprise responding to the incoming data packets without invoking processing in the main wireless processing subsystem 810 where the criteria associated with the incoming data packets do not trigger the one or more dynamic rules and sending the outgoing messages (e.g., service announcements, advertisements, status changes, etc.). Furthermore, processing in the main wireless processing subsystem 810 may be invoked in response to the criteria associated with the incoming data packets meeting the one or more dynamic rules. However, whereas the pattern matching performed at the programmable DPI module 835 may generally comprise comparing strings from individual packets to the service-specific dynamic rules, the low-power co-processor 839 may perform pattern matching that involves more complex multi-string matching. Accordingly, the low-power co-processor 839 may consider one or more parameters or other information that relates to operating conditions or states associated with the wireless device 800 in combination with service-specific requirements and/or device capabilities to determine whether any dynamic rules that require processing in the main wireless processing system 810 have been triggered. For example, the co-processor 839 may respond to incoming data packets that comprise service discovery inquiries about available services provided on the wireless device 800 and/or desired services to be consumed at the wireless device 800 without waking the components in the main wireless processing subsystem 810. However, the co-processor 839 may engage the components in the main wireless processing subsystem 810 where the incoming data packets have a payload size that exceeds a particular service-specific threshold (e.g., a payload size associated with service-specific application data, whereas service discovery inquiries and other similar messages may typically have a relatively small payload size). Alternatively, the co-processor 839 may engage the components in the main wireless processing subsystem 810 in the event that the incoming data packets specify one or more service requirements and/or device capabilities that match the available services provided on the wireless device 800 and/or the desired services to be consumed at the wireless device 800 to request appropriate assistance that may be needed to establish the service-specific session (e.g., binding ports, establishing sockets, etc.).

Furthermore, as noted above, the dynamic rules may specify one or more service-specific search strings to define conditions that may require processing at the components in the main wireless processing subsystem 810, wherein the co-processor 839 may engage the components in the main wireless processing subsystem 810 in response to detecting one or more matching strings that indicate a need to utilize the higher power, higher bandwidth processing capabilities available therein. For example, in a service-specific screen sharing use case, the bandwidth needed to achieve sufficient screen sharing performance may depend on screen size, resolution, and/or other relevant parameters. In particular, in a VGA screen sharing use case, where the resolution is approximately 640×480 pixels, little bandwidth may be needed, whereas Ultra HD 4K resolution at 3840×2160 lines requires large bandwidth. As such, the dynamic rules in screen sharing use cases may depend on the frames per second processing resources available at the wireless device 800 and/or any peer devices involved in the screen sharing, in that Ultra HD 4K screen sharing may generally require a wall-plugged power source. In that sense, the service-specific dynamic rules may require that peer endpoints exchange information relating to available power sources and capabilities to display data at the necessary frames per second, whereby the components in the main wireless processing subsystem 810 may be invoked in the event that the incoming data packets indicate that the co-processor subsystem 830 cannot meet the demanded performance. In another example use case, resolving audio in stereo may require relatively little throughput, as the more important issue instead pertains to maintaining synchronization between left and right channels. As such, in a use case where the wireless device 800 is streaming stereo audio to another peer device, the dynamic rules may specify that the components in the main wireless processing subsystem 810 should be invoked if the peer device indicates that synchronization has been lost between the left and right channels. Similarly, where the wireless device 800 is receiving stereo audio streamed from a peer device, the dynamic rules may specify that the components in the main wireless processing subsystem 810 should be invoked if the wireless device 800 determines that synchronization has been lost between the left and right channels.

As such, in these and other service-specific use cases, the dynamic rules may define one or more search strings (e.g., binary search strings) to compare against parameters carried in protocol-specific and service-specific messages, wherein the components in the main wireless processing subsystem 810 may be invoked in response to the protocol-specific and service-specific messages including criteria that matches the search strings defined in the one or more dynamic rules. Otherwise, processing may continue to be offloaded to the co-processor subsystem 830. Furthermore, in the event that the components in the main wireless processing subsystem 810 may be invoked, the dynamic rules may be redefined or otherwise tuned in response to a determination that the components in the main wireless processing subsystem 810 were not required to achieve the necessary performance demands and thereby increase the time that the components in the main wireless processing subsystem 810 can remain in a low-power state.

With specific reference to FIG. 8A, the architecture illustrated therein may operate the co-processor subsystem 830 in a look-aside mode. More particularly, in the look-aside mode, outgoing messages that relate to service announcements, service advertisements, service status changes, service inquiries, and responses to certain incoming messages (e.g., incoming service inquiries) may be buffered in the on-chip memory 837. The packet acquisition module 833 may then move the outgoing messages from the on-chip memory 837 to the synchronous host interface 831 according to any applicable schedules related thereto (e.g., one or more schedules that define when to publish service announcements, service advertisements, service status changes, inquiries about desired services, etc.). The synchronous host interface 831 may then cause the outgoing messages to be transmitted via the wireless radio(s) 850, whereby the outgoing messages may be transmitted via an outgoing data path 842 that bypasses the main wireless processing subsystem 810 altogether. Furthermore, in the look-aside mode, incoming data packets may be received at the co-processor subsystem 830 via an incoming data path 844 that likewise bypasses the main wireless processing subsystem 810. For example, the incoming data path 844 may pass through the wireless radio(s) 850 to the synchronous host interface 831, and the packet acquisition module 833 may then move the incoming packets to a receive queue on the on-chip memory 837. The programmable DPI module 835 may then perform the above-mentioned pre-processing tasks on the incoming data packets stored in the receive queue and selectively engage the host bridge 822 to either further optimize power consumption or wake one or more components in the main wireless processing subsystem 810 depending on whether or not any incoming data packets do not pass the filters implemented therein According to various aspects, in the event that the incoming data packet passes the filters implemented in the programmable DPI module 835, the pre-processed incoming data packets may be provided to the co-processor 839, which may further process the incoming data packets against the one or more dynamic rules using a local decision engine, as discussed in further detail above. As such, where the co-processor 839 further determines that the incoming data packets do not trigger any dynamic rules that define conditions under which to engage the component(s) in the main wireless processing subsystem 810, the co-processor 839 may appropriately process the incoming data packets without utilizing any component(s) in the main wireless processing subsystem 810 (e.g., responding to service inquiries, distributing incoming data to service provider and/or service consumer entities on the wireless device 800, etc.). Alternatively, where the incoming data packets trigger one or more dynamic rules, the co-processor subsystem 830 may wake or otherwise engage one or more components in the main wireless processing subsystem 810 to invoke the processing capabilities associated therewith. However, because the incoming data packets have already been pre-processed at the co-processor subsystem 830, any processing invoked in the main wireless processing subsystem 810 may be expedited or otherwise optimized in that the pre-processing may trap certain commands and/or other suitable messages to ensure that incoming data packets relating to synchronization, interrupt look-ups, or other suitable tasks having timing-critical aspects are processed with minimal latency. Furthermore, according to various aspects, the components that are invoked in the main wireless processing subsystem 810 may determine whether or not the processing capabilities in the main wireless processing system 810 were actually necessary to deal with the conditions that resulted in the wakeup, whereby the dynamic rules may be redefined or otherwise tuned based on platform and the service-specific use-case context(s) in the event that the components in the main wireless processing subsystem 810 were not required to achieve the necessary performance demands. As such, the dynamic rules may be redefined or otherwise tuned to prevent subsequent unnecessary wakeups, which may therefore not occur if the same conditions arise such that the components in the main wireless processing subsystem 810 can spend more time in the low-power state(s).

According to various aspects, with specific reference to FIG. 8B, the architecture illustrated therein may operate the co-processor subsystem 830 in a bump-in-the-wire mode, which may alternatively be referred to as a bump-in-the-stack or flow-through mode. More particularly, in the bump-in-the-wire mode, one or more outgoing messages may be stored in the interconnect and system memory 824 in the main wireless processing subsystem 810 and then pass through to the on-chip memory 837 and the programmable DPI module 835 before returning to the interconnect and system memory 824. The outgoing messages may then be transferred to the host bridge 822 and transmitted over a wireless network via the one or more wireless radios 850. In that sense, the programmable DPI module 835 may analyze the outgoing messages based on the dynamic rules and service-specific requirements and device capabilities to determine whether any outgoing messages need to be prioritized over other outgoing messages (e.g., prioritizing service-specific application data over device discovery inquiries, service discovery announcements/inquiries, etc.). Accordingly, in the bump-in-the-wire mode, the co-processor subsystem 830 may be utilized to classify outgoing packets according to service-specific flows (e.g., a source IP address and port, a destination IP address and port, service-specific protocols, etc.) and optimize outgoing transmissions to meet quality of service (QoS) and/or quality of experience (QoE) requirements, improve delivery through congestion points, or otherwise queue and shape the outgoing traffic to meet service-specific performance demands and optimize power consumption on the wireless device 800. As such, in the bump-in-the-wire mode, the outgoing messages may travel via an outgoing data path 842 that partially traverses the main wireless processing subsystem 810 and the co-processor subsystem 830.

According to various aspects, in the bump-in-the-wire mode, the incoming data path 844 may likewise traverse the host bridge 822 and the interconnect and system memory 824 and then flow through the on-chip memory 837 and the programmable DPI module 835 before returning to the interconnect and system memory 724. As such, the programmable DPI module 835 may perform substantially similar pre-processing tasks on the incoming data packets as described above with respect to the look-aside mode except that the incoming data packets may be received via the higher-bandwidth host bridge 822 and interconnect and system memory 824. The bump-in-the-wire mode may therefore offer similar benefits as the look-aside mode in that the host application processor 826 can remain in a low-power state except that the bump-in-the-wire mode may offer greater performance at the cost of utilizing at least some high-power high-bandwidth components in the main wireless processing subsystem 810. Accordingly, in various embodiments, the bump-in-the-wire mode may be better suited to service-specific use cases that have greater performance demands (e.g., the co-processor subsystem 830 may operate in the look-aside mode to handle simple file transfers or services that involve streaming low resolution VGA video, whereas the bump-in-the-wire mode may be utilized to handle sessions that involve services to stream high resolution HD video).

Figure 9:
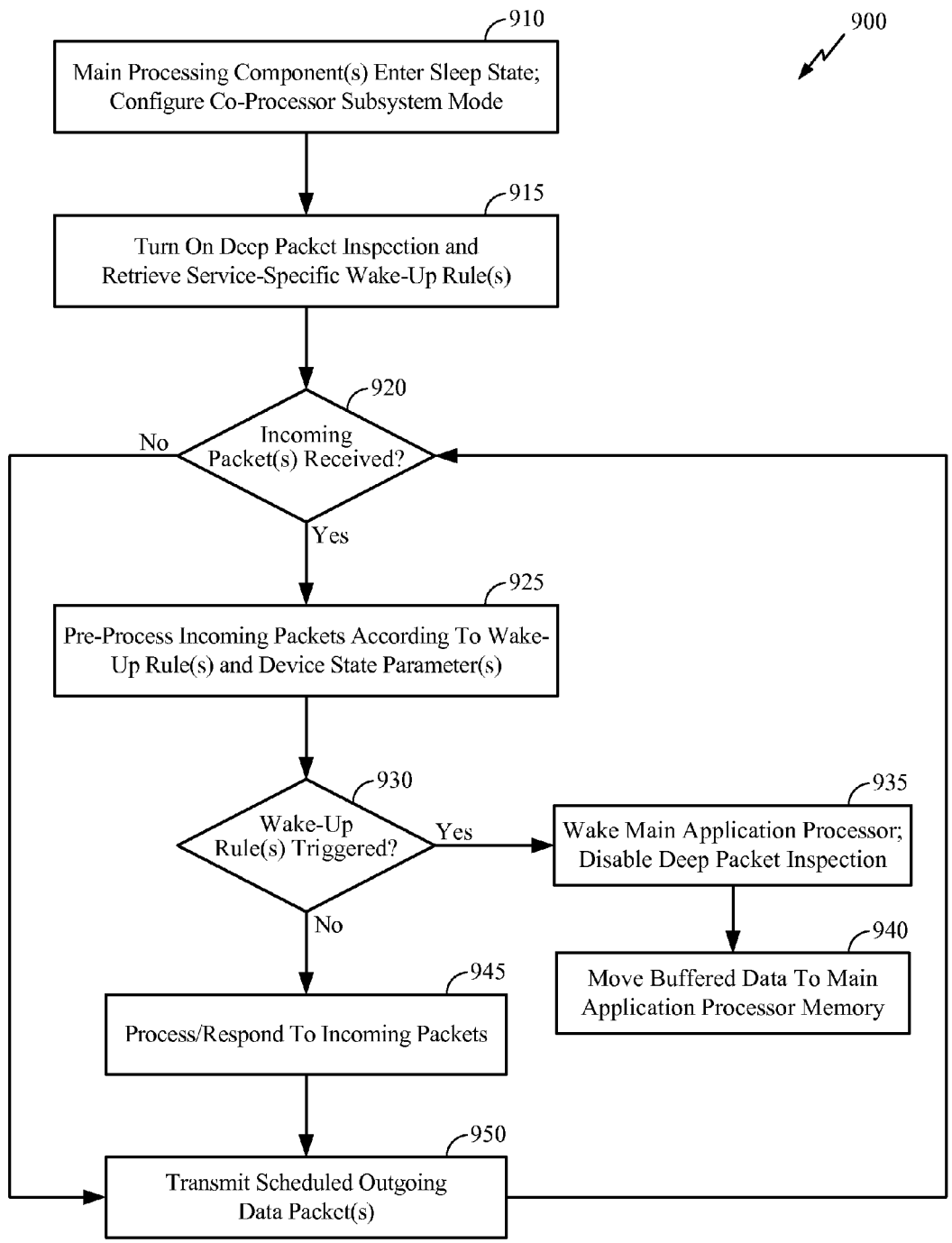
FIG. 9 illustrates an exemplary method that a low-power low-bandwidth co-processor subsystem may perform to optimize service discovery power consumption in a wireless service platform, according to various aspects.

According to various aspects, FIG. 9 illustrates an exemplary method 900 that a low-power low-bandwidth co-processor subsystem disposed in a wireless application datapath may perform to optimize service discovery power consumption in a wireless service platform. More particularly, at block 910, one or more components in a main wireless processing subsystem may enter a sleep state or another suitable low-power state and the co-processor subsystem may be configured to operate in either a look-aside mode or a bump-in-the-wire mode to offload one or more service discovery tasks from the components in the main wireless processing subsystem that entered the low-power state. For example, in the look-aside mode, the components that enter the low-power state may comprise a host bridge, a main interconnect and system memory, and a host application processor configured to run a high-level operating system. Alternatively, in the bump-in-the-wire mode, the host bridge and the main interconnect and system memory may remain active and only the host application processor enters the low-power state. Accordingly, in various embodiments, the particular mode in which to operate the co-processor subsystem may be selected at block 910 based on the current operating conditions or states associated on a wireless device and any service-specific requirements and device capabilities. For example, if the wireless device has a low battery charge state and does not have a wall-plugged power source, the co-processor subsystem may be operated in the look-aside mode to conserve more power. In another example, if the wireless device is actively providing and/or consuming a service that has substantial performance demands and the battery charge state is above a threshold level and/or a wall-plugged power source is available, the co-processor subsystem may operate in the bump-in-the-wire to optimize performance.

In various embodiments, once the components in the main wireless processing subsystem enter the low-power state, deep packet inspection (DPI) may be turned on within the co-processor subsystem and one or more service-specific wake-up rules may be retrieved at block 915. For example, as discussed in further detail above, the service-specific wake-up rules may generally specify one or more conditions under which to wake one or more component(s) in the main wireless processing subsystem or under which to otherwise invoke processing in the main wireless processing subsystem, which may be expressed according to the particular semantics used in the service descriptions associated with one or more services provided and/or consumed at the wireless device. Moreover, in various embodiments, the service-specific wake-up rules may optionally further specify the conditions under which to wake one or more component(s) in the main wireless processing subsystem or otherwise invoke processing in the main wireless processing subsystem according to operating conditions or current states on with the wireless device.

In various embodiments, at block 920, the co-processor subsystem may then determine whether any incoming packets have been received, in which case the incoming packets may be pre-pre-processed according to the service-specific wake-up rules and one or more parameters or other information that relate to the operating conditions and/or current state(s) associated with the wireless device. The co-processor subsystem may then determine whether one or more wake-up rules have been triggered at block 930, in which case the main application processor may be woken from the low-power state and DPI may be disabled at block 935. Furthermore, in the event that the co-processor subsystem was configured to operate in the bump-in-the-wire mode, the host bridge and system interconnect and memory may be further woken from the low-power state. In various embodiments, any buffered data associated with the incoming packets and any buffered data associated with outgoing messages that are pending transmission may then be moved to a memory associated with the main application processor at block 940 and the main wireless processing subsystem may resume performing the service discovery tasks that would otherwise have been offloaded to the co-processor subsystem.

According to various embodiments, in response to the co-processor subsystem determining that the pre-processed incoming data packets did not trigger any service-specific wake-up rules at block 930, the components in the main wireless processing subsystem that entered the low-power state may remain in such a low-power state, as the co-processor subsystem may process/respond to the incoming packets at block 945 without utilizing the main wireless processing subsystem. Furthermore, in various embodiments, the co-processor subsystem may transmit any scheduled outgoing data packets at block 950. For example, in various embodiments, the scheduled outgoing data packets may comprise service announcements, service advertisements, service status changes, responses to service discovery inquiries, inquiries about services desired at the wireless device, etc. Furthermore, returning to block 920, the co-processor subsystem may proceed directly to block 950 to transmit the scheduled outgoing data packets in response to determining that no incoming packets have been received or a receive queue is otherwise empty.

Figure 10:
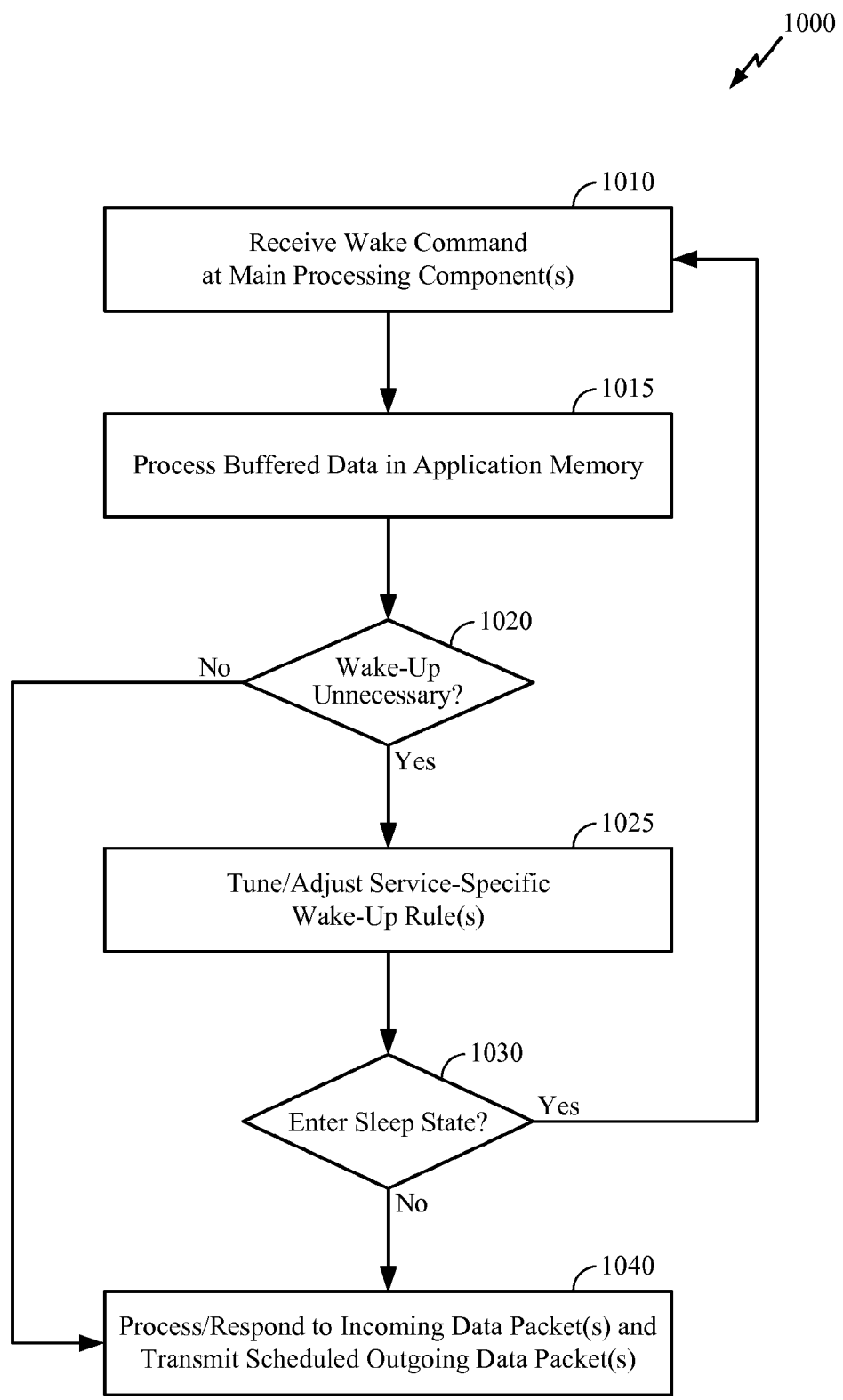
FIG. 10 illustrates an exemplary method that an application processor disposed in a main wireless application datapath may perform to optimize service discovery power consumption in a wireless service platform having a low-power low-bandwidth co-processor subsystem, according to various aspects.

According to various aspects, FIG. 10 illustrates an exemplary method 1000 that may be performed at the main application processor disposed in a main wireless application datapath to optimize service discovery power consumption in a wireless service platform having a low-power low-bandwidth co-processor subsystem. More particularly, in various embodiments, the method 1000 shown in FIG. 10 may generally be carried out in response to a wake command received at one or more components in the main wireless application datapath, for example, because one or more incoming data packets triggered a service-specific wake-up rule as described in further detail above. As such, any buffered data relating to incoming data packets and/or outgoing messages pending transmission may then be processed at block 1015. In various embodiments, at block 1020, the main application processor may then determine whether the wake-up was actually necessary. For example, the wake-up may be deemed unnecessary in response to a determination that the co-processor subsystem could have suitably processed the incoming data packets that triggered the wake-up without compromising any power or other performance demands associated with one or more provided and/or consumed services to which the incoming data packets pertain. As such, in response to determining that the wake-up was unnecessary, the service-specific wake-up rules that resulted in the unnecessary wake-up may be tuned or otherwise adjusted at block 1025 such that subsequent unnecessary wakeups may not occur if the same conditions arise. The components in the main wireless application datapath may then determine whether conditions are such that the components in the main wireless application datapath can re-enter the sleep state at block 1030, in which case the sleep state may be resumed until a subsequent wake command is received at block 1010. Otherwise, if the wake-up was necessary and/or conditions are such that the processing capabilities associated with the main wireless application datapath are still needed, the wireless device may continue to utilize the components in the main wireless application datapath to process/respond to incoming data packets and transmit scheduled outgoing data packets until suitable conditions to enter a low-power state arise.

Those skilled in the art will appreciate that information and signals may be represented using any of a variety of different technologies and techniques. For example, data, computer-executable instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination thereof. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as computer-executable instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of computer-executable instructions or data structures accessible by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, those skilled in the art will appreciate that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for optimizing power consumption in a service discovery wireless services platform, comprising:
  establishing a peer-to-peer wireless connection at a wireless device;
  transitioning one or more components in a main wireless application datapath associated with the wireless device to a sleep state, wherein the one or more components transitioned to the sleep state include at least a main application processor;
  offloading one or more service discovery tasks from the one or more components transitioned to the sleep state to a low-power co-processor coupled to the one or more components in the main wireless application datapath, wherein the one or more service discovery tasks offloaded to the low-power co-processor are determined at least in part according to a service description associated with a service discovery protocol used in the peer-to-peer wireless connection;
  defining one or more dynamic rules to wake the one or more components in the main wireless application datapath from the sleep state based at least in part on the service description associated with the service discovery protocol used in the peer-to-peer wireless connection;
  receiving, at the low-power co-processor, one or more incoming data packets over the peer-to-peer wireless connection; and
  selectively waking the one or more components in the main wireless application datapath from the sleep state in response to the one or more incoming data packets having criteria that trigger the one or more dynamic rules.

2. The method recited in claim 1, further comprising:
  responding to the one or more incoming data packets without waking the one or more components in the main wireless application datapath in response to the one or more incoming data packets including a service discovery inquiry.

3. The method recited in claim 1, further comprising:
  waking the one or more components in the main wireless application datapath in response to the one or more incoming data packets having a payload size that exceeds a threshold; and
  processing the one or more incoming data packets without waking the one or more components in the main wireless application datapath in response to the payload size associated with the one or more incoming data packets not exceeding the threshold.

4. The method recited in claim 1, further comprising:
  processing the one or more incoming data packets without waking the one or more components in the main wireless application datapath in response to the one or more incoming data packets including content that does not match one or more binary search strings associated with the one or more dynamic rules.

5. The method recited in claim 1, further comprising:
  waking the one or more components in the main wireless application datapath in response to the one or more incoming data packets including content that matches one or more binary search strings associated with the one or more dynamic rules.

6. The method recited in claim 5, further comprising:
  determining that the one or more components in the main wireless application datapath were not required to be woken from the sleep state based on the one or more incoming data packets that included the content matching the one or more binary search strings; and
  tuning the one or more dynamic rules to prevent subsequent unnecessary wakeups by the low-power co-processor.

7. The method recited in claim 1, further comprising:
  sending a service announcement in one or more outgoing data packets without waking the one or more components in the main wireless application datapath.

8. The method recited in claim 1, further comprising:
  receiving the one or more incoming data packets via an incoming data path that bypasses the main wireless application datapath in a look-aside mode; and
  transmitting one or more outgoing data packets via an outgoing data path that further bypasses the main wireless application datapath in the look-aside mode.

9. The method recited in claim 1, further comprising:
  receiving the one or more incoming data packets via an incoming data path that bypasses at least one first component in the main wireless application datapath and passes through at least one second component in the main wireless application datapath in a bump-in-the-wire mode; and
  transmitting one or more outgoing data packets via an outgoing data path that bypasses the at least one first component in the main wireless application datapath and passes through the at least one second component in the main wireless application datapath in the bump-in-the-wire mode.

10. The method recited in claim 9, further comprising:
  pre-processing, at the low-power co-processor, one or more of a command or a timing-critical message that requires processing at the main application processor prior to waking the main application processor in the bump-in-the-wire mode; and
  waking the main application processor to finish processing the pre-processed command or the timing-critical message.

11. An apparatus, comprising:
  means for establishing a peer-to-peer wireless connection;
  means for transitioning one or more components in a main wireless application datapath to a sleep state, wherein the one or more components transitioned to the sleep state include at least a main application processor;
  means for offloading one or more service discovery tasks from the one or more components transitioned to the sleep state, wherein the one or more offloaded service discovery tasks are determined at least in part according to a service description associated with a service discovery protocol used in the peer-to-peer wireless connection;
  means for defining one or more dynamic rules to wake the one or more components in the main wireless application datapath from the sleep state based at least in part on the service description associated with the service discovery protocol used in the peer-to-peer wireless connection;
  means for receiving one or more incoming data packets over the peer-to-peer wireless connection; and
  means for selectively waking the one or more components in the main wireless application datapath from the sleep state in response to the one or more incoming data packets having criteria that trigger the one or more dynamic rules.

12. The apparatus recited in claim 11, further comprising:
  means for responding to the one or more incoming data packets without waking the one or more components in the main wireless application datapath in response to the one or more incoming data packets including a service discovery inquiry.

13. The apparatus recited in claim 11, further comprising:
means for waking the one or more components in the main wireless application datapath in response to the one or more incoming data packets having a payload size that exceeds a threshold; and
means for processing the one or more incoming data packets without waking the one or more components in the main wireless application datapath in response to the payload size associated with the one or more incoming data packets not exceeding the threshold.

14. The apparatus recited in claim 11, further comprising:
means for processing the one or more incoming data packets without waking the one or more components in the main wireless application datapath in response to the one or more incoming data packets including content that does not match one or more binary search strings associated with the one or more dynamic rules.

15. The apparatus recited in claim 11, further comprising:
means for waking the one or more components in the main wireless application datapath in response to the one or more incoming data packets including content that matches one or more binary search strings associated with the one or more dynamic rules.

16. The apparatus recited in claim 15, further comprising:
means for determining that the one or more components in the main wireless application datapath were not required to be woken from the sleep state based on the one or more incoming data packets that included the content matching the one or more binary search strings; and
means for tuning the one or more dynamic rules to prevent subsequent unnecessary wakeups at the one or more components in the main wireless application datapath.

17. The apparatus recited in claim 11, further comprising:
means for sending a service announcement in one or more outgoing data packets without waking the one or more components in the main wireless application datapath.

18. The apparatus recited in claim 11, further comprising:
means for receiving the one or more incoming data packets via an incoming data path that bypasses the main wireless application datapath in a look-aside mode; and
means for transmitting one or more outgoing data packets via an outgoing data path that further bypasses the main wireless application datapath in the look-aside mode.

19. The apparatus recited in claim 11, further comprising:
means for receiving the one or more incoming data packets via an incoming data path that bypasses at least one first component in the main wireless application datapath and passes through at least one second component in the main wireless application datapath in a bump-in-the-wire mode; and
means for transmitting one or more outgoing data packets via an outgoing data path that bypasses the at least one first component in the main wireless application datapath and passes through the at least one second component in the main wireless application datapath in the bump-in-the-wire mode.

20. The apparatus recited in claim 19, further comprising:
means for pre-processing one or more of a command or a timing-critical message that requires processing at the main application processor prior to waking the main application processor in the bump-in-the-wire mode; and means for waking the main application processor to finish processing the pre-processed command or the timing-critical message.

21. A non-transitory computer-readable storage medium having computer-executable instructions recorded thereon, wherein executing the computer-executable instructions on one or more processors causes the one or more processors to:
establish a peer-to-peer wireless connection at a wireless device;
transition one or more components in a main wireless application datapath associated with the wireless device to a sleep state, wherein the one or more components transitioned to the sleep state include at least a main application processor;
offload one or more service discovery tasks from the one or more components transitioned to the sleep state to a low-power co-processor coupled to the one or more components in the main wireless application datapath, wherein the one or more service discovery tasks offloaded to the low-power co-processor are determined at least in part according to a service description associated with a service discovery protocol used in the peer-to-peer wireless connection;
define one or more dynamic rules to wake the one or more components in the main wireless application datapath from the sleep state based at least in part on the service description associated with the service discovery protocol used in the peer-to-peer wireless connection;
receive, at the low-power co-processor, one or more incoming data packets over the peer-to-peer wireless connection; and
selectively wake the one or more components in the main wireless application datapath from the sleep state in response to the one or more incoming data packets having criteria that trigger the one or more dynamic rules.

22. A wireless device, comprising:
a main wireless application datapath, wherein the main wireless application datapath comprises a host bridge, an interconnect, system memory, and a host application processor; and
a low-power hardware processor coupled to the main wireless application datapath, wherein the low-power hardware processor comprises:
a local memory configured to store one or more outgoing data packets associated with one or more service discovery tasks offloaded from the main wireless application datapath and a schedule to send the one or more outgoing data packets, wherein the one or more offloaded service discovery tasks and the schedule to send the one or more outgoing data packets are determined at least in part according to a service description associated with a service discovery protocol;
a programmable deep-packet inspection module configured with one or more dynamic rules to invoke processing in the main wireless application datapath, wherein the one or more dynamic rules are based at least in part on the service description associated with the service discovery protocol, the programmable deep-packet inspection module further configured to determine whether criteria associated with one or more incoming data packets received at the wireless device trigger the one or more dynamic rules; and
a low-power host processor configured to perform the one or more offloaded service discovery tasks, to respond to the one or more incoming data packets without invoking processing in the main wireless application datapath in response to the criteria associated with the one or more incoming data packets not triggering the one or more dynamic rules, and to invoke the processing in the main wireless application datapath in response to the criteria associated with the one or more incoming data packets triggering the one or more dynamic rules.

23. The wireless device recited in claim 22, wherein the low-power host processor is configured to respond to the one or more incoming data packets without invoking the processing in the main wireless application datapath in response to the one or more incoming data packets including a service discovery inquiry.

24. The wireless device recited in claim 22, wherein the low-power host processor is further configured to:
  invoke the processing in the main wireless application datapath in response to the one or more incoming data packets having a payload size that exceeds a threshold; and
  process the one or more incoming data packets without invoking the processing in the main wireless application datapath in response to the payload size associated with the one or more incoming data packets not exceeding the threshold.

25. The wireless device recited in claim 22, wherein the low-power host processor is further configured to:
  process the one or more incoming data packets without invoking the processing in the main wireless application datapath in response to the one or more incoming data packets including content that does not match one or more binary search strings associated with the one or more dynamic rules; and
  invoke the processing in the main wireless application datapath in response to the content associated with the one or more incoming data packets matching the one or more binary search strings associated with the one or more dynamic rules.

26. The wireless device recited in claim 25, wherein the host application processor is configured to:
  determine that the processing in the main wireless application datapath was not required based on the one or more incoming data packets that included the content matching the one or more binary search strings; and
  tune the one or more dynamic rules to prevent subsequent unnecessary processing in the main wireless application datapath.

27. The wireless device recited in claim 22, wherein the low-power hardware processor is configured to transmit a service announcement in one or more outgoing data packets without invoking the processing in the main wireless application datapath.

28. The wireless device recited in claim 22, wherein the low-power hardware processor is configured to:
  receive the one or more incoming data packets via an incoming data path that bypasses the main wireless application datapath in a look-aside mode; and
  transmit one or more outgoing data packets via an outgoing data path that further bypasses the main wireless application datapath in the look-aside mode.

29. The wireless device recited in claim 22, wherein the low-power hardware processor is configured to:
  receive the one or more incoming data packets via an incoming data path that bypasses at least one first component in the main wireless application datapath and passes through at least one second component in the main wireless application datapath in a bump-in-the-wire mode; and
  transmit one or more outgoing data packets via an outgoing data path that bypasses the at least one first component in the main wireless application datapath and passes through the at least one second component in the main wireless application datapath in the bump-in-the-wire mode.

30. The wireless device recited in claim 29, wherein the low-power hardware processor is further configured to:
  pre-process one or more of a command or a timing-critical message that requires processing at the host application processor at one or more of the programmable deep-packet inspection module or the low-power host processor prior to engaging one or more components in the main application processor in the bump-in-the-wire mode; and
  invoke processing in the host application processor to finish processing the pre-processed command or the timing-critical message.

* * * * *